(12) United States Patent
Clodic et al.

(10) Patent No.: US 8,999,057 B2
(45) Date of Patent: Apr. 7, 2015

(54) CEMENT AND CONCRETE WITH CALCIUM ALUMINATES

(71) Applicant: Calera Corporation, Los Gatos, CA (US)

(72) Inventors: Laurence Clodic, Sunnyvale, CA (US); Samuel O. Morgan, San Jose, CA (US); Irvin Chen, Santa Clara, CA (US)

(73) Assignee: Calera Corporation, Los Gatos, CA (US)

( * ) Notice: Subject to any disclaimer, the term of this patent is extended or adjusted under 35 U.S.C. 154(b) by 394 days.

(21) Appl. No.: 13/629,372

(22) Filed: Sep. 27, 2012

(65) Prior Publication Data

US 2013/0255542 A1    Oct. 3, 2013

Related U.S. Application Data

(60) Provisional application No. 61/540,416, filed on Sep. 28, 2011.

(51) Int. Cl.
| | |
|---|---|
| *C04B 7/32* | (2006.01) |
| *C04B 28/06* | (2006.01) |
| *C04B 28/10* | (2006.01) |
| *C01F 7/16* | (2006.01) |
| *C01F 11/18* | (2006.01) |

(52) U.S. Cl.
CPC . *C04B 7/32* (2013.01); *C04B 28/06* (2013.01); *C04B 28/10* (2013.01); *C01F 7/164* (2013.01); *C01F 11/18* (2013.01); *C01P 2004/61* (2013.01); *C01P 2006/12* (2013.01); *C01P 2006/80* (2013.01)

(58) Field of Classification Search
CPC .......................................................... C04B 7/32
USPC .................................................. 106/692, 695
See application file for complete search history.

(56) References Cited

U.S. PATENT DOCUMENTS

| | | | |
|---|---|---|---|
| 7,735,274 | B2 | 6/2010 | Constantz et al. |
| 7,744,761 | B2 | 6/2010 | Constantz et al. |
| 7,749,476 | B2 | 7/2010 | Constantz et al. |
| 7,753,618 | B2 | 7/2010 | Constantz et al. |
| 7,754,169 | B2 | 7/2010 | Constantz et al. |
| 7,771,684 | B2 | 8/2010 | Constantz et al. |
| 7,790,012 | B2 | 9/2010 | Kirk et al. |
| 7,815,880 | B2 | 10/2010 | Constantz et al. |
| 7,829,053 | B2 | 11/2010 | Constantz et al. |

(Continued)

FOREIGN PATENT DOCUMENTS

| | | |
|---|---|---|
| EP | 2253600 A1 | 11/2010 |
| JP | 2000-143318 A | 5/2000 |

(Continued)

OTHER PUBLICATIONS

International search report and written opinion dated Mar. 20, 2013 for PCT/US2012/057637.

(Continued)

*Primary Examiner* — Paul Marcantoni
(74) *Attorney, Agent, or Firm* — Vandana Bansal; Calera Corporation

(57) ABSTRACT

Provided herein are systems, methods, and compositions related to mixtures of calcium aluminate cements with compositions comprising carbonate. The compositions comprising carbonates may be formed by sequestering carbon dioxide.

25 Claims, 13 Drawing Sheets

(56) References Cited

U.S. PATENT DOCUMENTS

| | | | |
|---|---|---|---|
| 7,875,163 | B2 | 1/2011 | Gilliam et al. |
| 7,887,694 | B2 | 2/2011 | Constantz et al. |
| 7,906,028 | B2 | 3/2011 | Constantz et al. |
| 7,914,685 | B2 | 3/2011 | Constantz et al. |
| 7,922,809 | B1 | 4/2011 | Constantz et al. |
| 7,931,809 | B2 | 4/2011 | Constantz et al. |
| 7,939,336 | B2 | 5/2011 | Constantz et al. |
| 7,966,250 | B2 | 6/2011 | Constantz et al. |
| 7,993,500 | B2 | 8/2011 | Gilliam et al. |
| 7,993,511 | B2 | 8/2011 | Gilliam et al. |
| 8,006,446 | B2 | 8/2011 | Constantz et al. |
| 8,062,418 | B2 | 11/2011 | Constantz et al. |
| 8,114,214 | B2 | 2/2012 | Constantz et al. |
| 8,137,455 | B1 | 3/2012 | Constantz et al. |
| 2009/0001020 | A1 | 1/2009 | Constantz et al. |
| 2009/0020044 | A1 | 1/2009 | Constantz et al. |
| 2009/0169452 | A1 | 7/2009 | Constantz et al. |
| 2009/0202410 | A1 | 8/2009 | Kawatra et al. |
| 2009/0301352 | A1 | 12/2009 | Constantz et al. |
| 2010/0000444 | A1 | 1/2010 | Constantz et al. |
| 2010/0024686 | A1 | 2/2010 | Constantz et al. |
| 2010/0051859 | A1 | 3/2010 | House et al. |
| 2010/0063902 | A1 | 3/2010 | Constantz et al. |
| 2010/0077691 | A1 | 4/2010 | Constantz et al. |
| 2010/0077922 | A1 | 4/2010 | Constantz et al. |
| 2010/0083880 | A1 | 4/2010 | Constantz et al. |
| 2010/0084280 | A1 | 4/2010 | Gilliam et al. |
| 2010/0111810 | A1 | 5/2010 | Constantz et al. |
| 2010/0116683 | A1 | 5/2010 | Gilliam et al. |
| 2010/0132556 | A1 | 6/2010 | Constantz et al. |
| 2010/0132591 | A1 | 6/2010 | Constantz et al. |
| 2010/0135865 | A1 | 6/2010 | Constantz et al. |
| 2010/0135882 | A1 | 6/2010 | Constantz et al. |
| 2010/0140103 | A1 | 6/2010 | Gilliam et al. |
| 2010/0144521 | A1 | 6/2010 | Constantz et al. |
| 2010/0150802 | A1 | 6/2010 | Gilliam et al. |
| 2010/0154679 | A1 | 6/2010 | Constantz et al. |
| 2010/0155258 | A1 | 6/2010 | Kirk et al. |
| 2010/0158786 | A1 | 6/2010 | Constantz et al. |
| 2010/0196104 | A1 | 8/2010 | Constantz et al. |
| 2010/0200419 | A1 | 8/2010 | Gilliam et al. |
| 2010/0219373 | A1 | 9/2010 | Seeker et al. |
| 2010/0224503 | A1 | 9/2010 | Kirk et al. |
| 2010/0229725 | A1 | 9/2010 | Farsad et al. |
| 2010/0230293 | A1 | 9/2010 | Gilliam et al. |
| 2010/0230830 | A1 | 9/2010 | Farsad et al. |
| 2010/0236242 | A1 | 9/2010 | Farsad et al. |
| 2010/0239467 | A1 | 9/2010 | Constantz et al. |
| 2010/0239487 | A1 | 9/2010 | Constantz et al. |
| 2010/0247410 | A1 | 9/2010 | Constantz et al. |
| 2010/0258035 | A1 | 10/2010 | Constantz et al. |
| 2010/0276299 | A1 | 11/2010 | Kelly et al. |
| 2010/0290967 | A1 | 11/2010 | Detournay et al. |
| 2010/0313793 | A1 | 12/2010 | Constantz et al. |
| 2010/0313794 | A1 | 12/2010 | Constantz et al. |
| 2010/0319586 | A1 | 12/2010 | Blount et al. |
| 2010/0326328 | A1 | 12/2010 | Constantz et al. |
| 2011/0030586 | A1 | 2/2011 | Constantz et al. |
| 2011/0030957 | A1 | 2/2011 | Constantz et al. |
| 2011/0033239 | A1 | 2/2011 | Constantz et al. |
| 2011/0035154 | A1 | 2/2011 | Kendall et al. |
| 2011/0036728 | A1 | 2/2011 | Farsad et al. |
| 2011/0042230 | A1 | 2/2011 | Gilliam et al. |
| 2011/0054084 | A1 | 3/2011 | Constantz et al. |
| 2011/0059000 | A1 | 3/2011 | Constantz et al. |
| 2011/0067600 | A1 | 3/2011 | Constantz et al. |
| 2011/0067603 | A1 | 3/2011 | Constantz et al. |
| 2011/0067605 | A1 | 3/2011 | Constantz et al. |
| 2011/0071309 | A1 | 3/2011 | Constantz et al. |
| 2011/0079515 | A1 | 4/2011 | Gilliam et al. |
| 2011/0083968 | A1 | 4/2011 | Gilliam et al. |
| 2011/0091366 | A1 | 4/2011 | Kendall et al. |
| 2011/0091955 | A1 | 4/2011 | Constantz et al. |
| 2011/0132234 | A1 | 6/2011 | Constantz et al. |
| 2011/0147227 | A1 | 6/2011 | Gilliam et al. |
| 2011/0203489 | A1 | 8/2011 | Constantz et al. |
| 2011/0226989 | A9 | 9/2011 | Seeker et al. |
| 2011/0240916 | A1 | 10/2011 | Constantz et al. |
| 2011/0247336 | A9 | 10/2011 | Farsad et al. |
| 2011/0277474 | A1 | 11/2011 | Constantz et al. |
| 2011/0277670 | A1 | 11/2011 | Self et al. |

FOREIGN PATENT DOCUMENTS

| | | |
|---|---|---|
| JP | 2001-097761 A | 4/2001 |
| WO | WO 2008/018928 A2 | 2/2008 |
| WO | WO 2008/148055 A1 | 12/2008 |
| WO | WO 2009/006295 A2 | 1/2009 |
| WO | WO 2008/018928 A3 | 3/2009 |
| WO | WO 2009/086460 A1 | 7/2009 |
| WO | WO 2009/006295 A3 | 12/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/055483 A2 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

Kralj, et al. Vaterite growth and dissolution in aqueous solution III. Kinetics of transformation. Journal of Crystal Growth. 1997; 177(3-4):248-257.

Spanos, et al. The transformation of vaterite to calcite: effect of the conditions of the solutions in contact with the mineral phase. Journal of Crystal Growth. 1998; 191:783-790.

Constantz, B. (2009) "The Risk of Implementing New Regulations on Game-Changing Technology: Sequestering CO2 in the Built Environment" AGU, 90(22), Jt. Assem, Suppl., Abstract.

Kuzel et al. "Hydration of calcium aluminate cements in the presence of calcium carbonate" Eur. J. Mineral. 8:129-141 (1996).

Luz et al. "CaCO3 addition effect on the hydration and mechanical strength evolution of calcium aluminate cement for endodontic applications" Ceramics International 38:1417-1425 Sep. 2011.

Perez et al., "Study of Stabilized Phases in High Alumina Cement Mortars Part I" Cement and Concrete Research; vol. 13: 759-770 (1983).

Perez et al., "Study of Stabilized Phases in High Alumina Cement Mortars Part II" Cement and Concrete Research; vol. 14: 1-10 (1984).

Scrivener et al "High-performance concretes from calcium aluminate cements" Cement and Concrete Research 29:1215-1223 (1999).

CEMENT AND CONCRETE WITH CALCIUM ALUMINATES

CROSS-REFERENCE TO RELATED APPLICATIONS

This application claims priority to U.S. Provisional Application No. 61/540,416, filed Sep. 28, 2011, which is incorporated herein by reference in its entirety in the present disclosure.

BACKGROUND

Carbon dioxide ($CO_2$) emissions have been identified as a major contributor to the phenomenon of global warming. $CO_2$ is a by-product of combustion and creates operational, economic, and environmental problems. The elevated atmospheric concentrations of $CO_2$ and other greenhouse gases may facilitate storage of heat within the atmosphere leading to enhanced surface temperatures and rapid climate change. In addition, elevated levels of $CO_2$ in the atmosphere may also acidify earth's oceans due to the dissolution of $CO_2$ and formation of carbonic acid. The impact of climate change and ocean acidification may be economically expensive and environmentally hazardous if not timely handled. Reducing potential risks of climate change may require sequestration and avoidance of $CO_2$ from various anthropogenic processes. Production of cement is a contributing factor in increasing $CO_2$ emissions.

SUMMARY

Provided herein are methods, systems, and compositions related to cementitious compositions containing carbonate compositions that contain vaterite and calcium aluminate cements (CAC). Also provided herein are methods, systems, and compositions related to mitigating $CO_2$ emissions.

In one aspect, there is provided a cementitious composition, comprising calcium aluminate cement and a composition comprising carbonate wherein the composition comprising carbonate comprises a metastable component selected from the group consisting of vaterite, amorphous calcium carbonate, and combination thereof. In some embodiments, the composition comprising carbonate in the foregoing cementitious composition comprises or has at least one of the following: a) at least 50 wt % vaterite; b) a $\delta^{13}C$ value less than –12.0‰; c) a wet paste pH of less than 12; and combinations thereof. In some embodiments, in the foregoing compositions, the composition comprising carbonate is a self-cement composition. In some embodiments, in the foregoing compositions, the composition comprising carbonate is a partial cement substitute (PCS). In some embodiments, in the foregoing compositions, the cementitious composition exhibits one or more of properties selected from the group consisting of higher reactivity of carbonate with aluminate phases, formation of monocarboaluminates, formation of hemicarboaluminates, higher compressive strength, higher durability over long time period, higher mechanical and structural properties, and combinations thereof, as compared to CAC alone. In some embodiments, in the foregoing compositions, the composition comprising carbonate has a mean particle size of between 1-25 microns. In some embodiments, in the foregoing compositions, the cementitious composition further comprises ordinary Portland cement, a Portland cement blend, pozzolan-lime cement, slag-lime cement, supersulfated cement, calcium sulfoaluminate cement, geopolymer cement, aggregate, admixtures, or combinations thereof. In some embodiments, in the foregoing compositions, the composition comprising carbonate comprises between 50-99 wt % vaterite. In some embodiments, in the foregoing compositions, the composition comprising carbonate has a $\delta^{13}C$ value of between –12.0‰ to –40‰. In some embodiments, in the foregoing compositions, the composition comprising carbonate comprises a wet paste pH of between 8-12. In some embodiments, the foregoing compositions comprise between 5-80 wt % composition comprising carbonate and 20-95 wt % of CAC. In some embodiments, in the foregoing compositions, the carbonate in the composition comprising carbonate is derived in whole or in part from carbon dioxide removed from an industrial waste stream. In some embodiments, in the foregoing compositions, the cementitious composition after combination with water, setting, and hardening has a compressive strength of between 10-55 MPa. In some embodiments, in the foregoing compositions, the cementitious composition after combination with water, setting, and hardening has a compressive strength greater than the compressive strength of CAC alone or a cementitious composition comprising ground calcium carbonate (GC or GCC) with CAC. In some embodiments, in the foregoing compositions, the cementitious composition after combination with water, setting, and hardening has a compressive strength more by at least 10 MPa compared to the compressive strength of CAC alone or the compressive strength of a cementitious composition comprising ground calcium carbonate (GC or GCC) with CAC.

In one aspect, there is provided a method for forming a cementitious or concrete composition, comprising combining a composition comprising carbonate wherein the composition comprising carbonate comprises a metastable component selected from the group consisting of vaterite, amorphous calcium carbonate, and combination thereof composition, with CAC to produce a cementitious or concrete composition. In some embodiments, the foregoing method further comprises a) making a composition comprising carbonate by contacting an industrial waste gas stream comprising carbon dioxide with a proton removing agent to form a carbon dioxide charged water; b) contacting the carbon dioxide charged water with divalent cations to form the composition comprising carbonate wherein the carbonate comprises a metastable component selected from the group consisting of vaterite, amorphous calcium carbonate, and combination thereof; and c) combining the composition comprising carbonate with CAC, to form the cementitious or the concrete composition. In some embodiments, in the foregoing methods, the contacting of the carbon dioxide charged water with the divalent cations is under precipitation conditions that favor the formation of the composition comprising a metastable component selected from the group consisting of vaterite, amorphous calcium carbonate, and combination thereof. In some embodiments, in the foregoing methods, the precipitation conditions favor the formation of more than 50 wt % vaterite in the composition. In some embodiments, in the foregoing methods, the precipitation conditions are selected from temperature, pH, residence time, proton removing agent, additive, ion ratio, rate of precipitation, mixing rate, form of agitation, presence of seed crystal, catalyst, membrane, substrate, separation, drying, refining, and combinations thereof. In some embodiments, in the foregoing methods, the industrial waste gas stream is from an industrial plant selected from power plant, chemical processing plant, steel mill, paper mill, cement plant, other industrial plant that produces $CO_2$ as a byproduct, and combinations thereof. In some embodiments, in the foregoing methods, the proton removing agent is NaOH, $Na_2CO_3$, KOH, $K_2CO_3$, $NH_4OH$, Ca(OH)$_2$, Mg(OH)$_2$, or combinations thereof. In some embodiments, in the foregoing methods, the divalent cation comprises calcium. In some embodiments, in the foregoing methods, the method further comprises contacting the cementitious or the concrete composition with water and converting the vaterite to aragonite when the composition sets and hardens into cement. In some embodiments, in the foregoing methods, the method further comprises contacting the cementitious or the concrete composition with water; interacting vaterite with aluminate in CAC; and forming monocarboaluminate, hemicarboaluminate, or combination thereof. In some embodiments, in the foregoing methods, the method further comprises adding to the composition a component selected from ordinary Portland cement, a Portland cement blend, pozzolan-lime cement, slag-lime cement, supersulfated cement, calcium sulfoaluminate cement, geopolymer cement, and combinations thereof. In some embodiments, in the foregoing methods, the method further comprises contacting the cementitious or the concrete composition with water; interacting vaterite with aluminate in CAC; and forming monocarboaluminate, hemicarboaluminate, or combination thereof; wherein the composition sets and hardens into cement or concrete with a compressive strength of between 10-55 MPa. In some embodiments, in the foregoing methods, the method further comprises contacting the cementitious or the concrete composition with water; interacting vaterite with aluminate in CAC; and forming monocarboaluminate, hemicarboaluminate, or combination thereof; wherein the composition sets and hardens into cement or concrete with a compressive strength greater than the compressive strength of CAC alone or the compressive strength of a composition comprising ground calcium carbonate (GC or GCC) with CAC. In some embodiments, in the foregoing methods, the method further comprises contacting the cementitious or the concrete composition with water; interacting vaterite with aluminate in CAC; and forming monocarboaluminate, hemicarboaluminate, or combination thereof; wherein the composition sets and hardens into cement or concrete with a compressive strength more by at least 10 MPa compared to the compressive strength of CAC alone or the compressive strength of a composition comprising ground calcium carbonate (GC or GCC) with CAC.

In one aspect, there is provided a composition produced according to the foregoing methods.

In some embodiments, in the foregoing methods, the method further comprises removing water from the composition to produce a concentrated composition, concentrated with respect to the carbonates, bicarbonates, or the combination thereof and then combining the concentrated composition and calcium aluminates to produce the cementitious or concrete composition. In some embodiments, the concentrated composition is a slurry comprising carbonates, bicarbonates, or a combination thereof. In some embodiments, the method further comprises drying the slurry to produce a dried composition. In some embodiments, the method further comprises spray drying the slurry to produce a dried composition. In some embodiments, particles of the dried composition have a mean particle size of less than 250 microns. In some embodiments, particles of the dried composition have a mean particle size of less than 100 microns. In some embodiments, particles of the dried composition have a mean particle size of less than 50 microns. In some embodiments, the cementitious or concrete composition comprises 1% to 30% by weight of the concentrated composition. In some embodiments, the cementitious or concrete composition comprises 5% to 25% by weight of the concentrated composition. In some embodiments, the cementitious or concrete composition further comprises ordinary Portland cement, a Portland cement blend, pozzolan-lime cement, slag-lime cement, supersulfated cement, calcium sulfoaluminate cement, geopolymer cement, or combinations thereof. In some embodiments, the cementitious or concrete composition further comprises ordinary Portland cement. In some embodiments, the cementitious or concrete composition further comprises gypsum. In some embodiments, the cementitious or concrete composition comprises gypsum, and the ratio of the dried composition to gypsum is about 1:3 by weight. In some embodiments, the cementitious or concrete composition comprises gypsum, and the ratio of the dried composition to gypsum is about 1:2 by weight. In some embodiments, the cementitious or concrete composition comprises gypsum, and the ratio of the dried composition to gypsum is about 1:1 by weight. In some embodiments, the method further comprises hydrating the combined composition to produce a fresh cement. In some embodiments, heat evolution in the fresh cement occurs sooner than in a fresh cement lacking the concentrated composition. In some embodiments, heat evolution in the fresh cement occurs over a longer period of time than in a fresh cement lacking the concentrated composition. In some embodiments, heat evolution in the fresh cement is less intense than in a fresh cement lacking the concentrated composition. In some embodiments, the method further comprises blending the fresh cement with aggregates, admixtures, or a combination thereof to produce a fresh concrete. In some embodiments, the method further comprises placing and curing the fresh concrete to produce a set concrete. In some embodiments, the set concrete has a higher compressive strength than after 1 day than a set concrete lacking the concentrated composition. In some embodiments, the set concrete has a higher compressive strength than after 7 days than a set concrete lacking the concentrated composition. In some embodiments, the set concrete has a higher compressive strength than after 28 days than a set concrete lacking the concentrated composition.

Provided herein is a composition, produced according any one of the methods described herein.

Provided herein is a composition, comprising a cement composition comprising calcium aluminates and a precipitation material or a composition comprising carbonates, bicarbonates, or a combination of carbonates and bicarbonates. In some embodiments, the composition is a dry composition. In some embodiments, particles of the dry composition have a mean particle size of less than 250 microns. In some embodiments, particles of the dry composition have a mean particle size of less than 100 microns. In some embodiments, particles of the dry composition have a mean particle size of less than 50 microns. In some embodiments, the dry composition comprises 1% to 30% by weight of the precipitation material. In some embodiments, the dry composition comprises 5% to 25% by weight of the precipitated material. In some embodiments, the cement composition comprises calcium aluminate cement. In some embodiments, the cement composition further comprises ordinary Portland cement, a Portland cement blend, pozzolan-lime cement, slag-lime cement, supersulfated cement, calcium sulfoaluminate cement, geopolymer cement, or combinations thereof. In some embodiments, the cement composition further comprises ordinary Portland cement. In some embodiments, the cement composition further comprises gypsum. In some embodiments, the cement composition further comprises gypsum, and the ratio of the dry composition to gypsum is about 1:3 by weight. In some embodiments, the cement composition further comprises gypsum, and the ratio of the dry composition to gypsum is about 1:2 by weight. In some embodiments, the cement composition further comprises gypsum, and the ratio of the dry composition to gypsum is about 1:1 by weight. In some embodiments, the composition further comprises aggregates, admixtures, or a combination thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

Figure 10A:
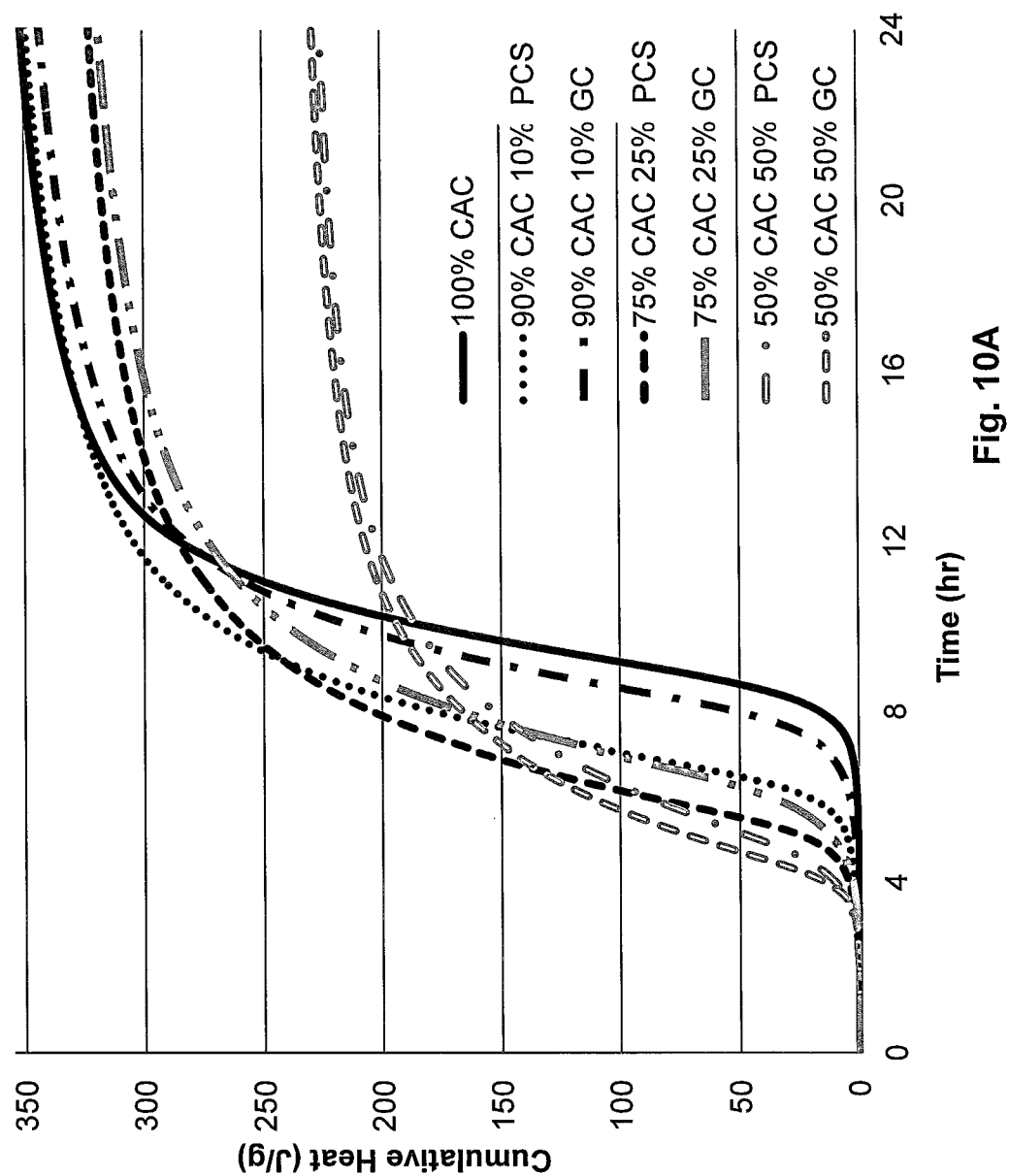
Figure 10B:
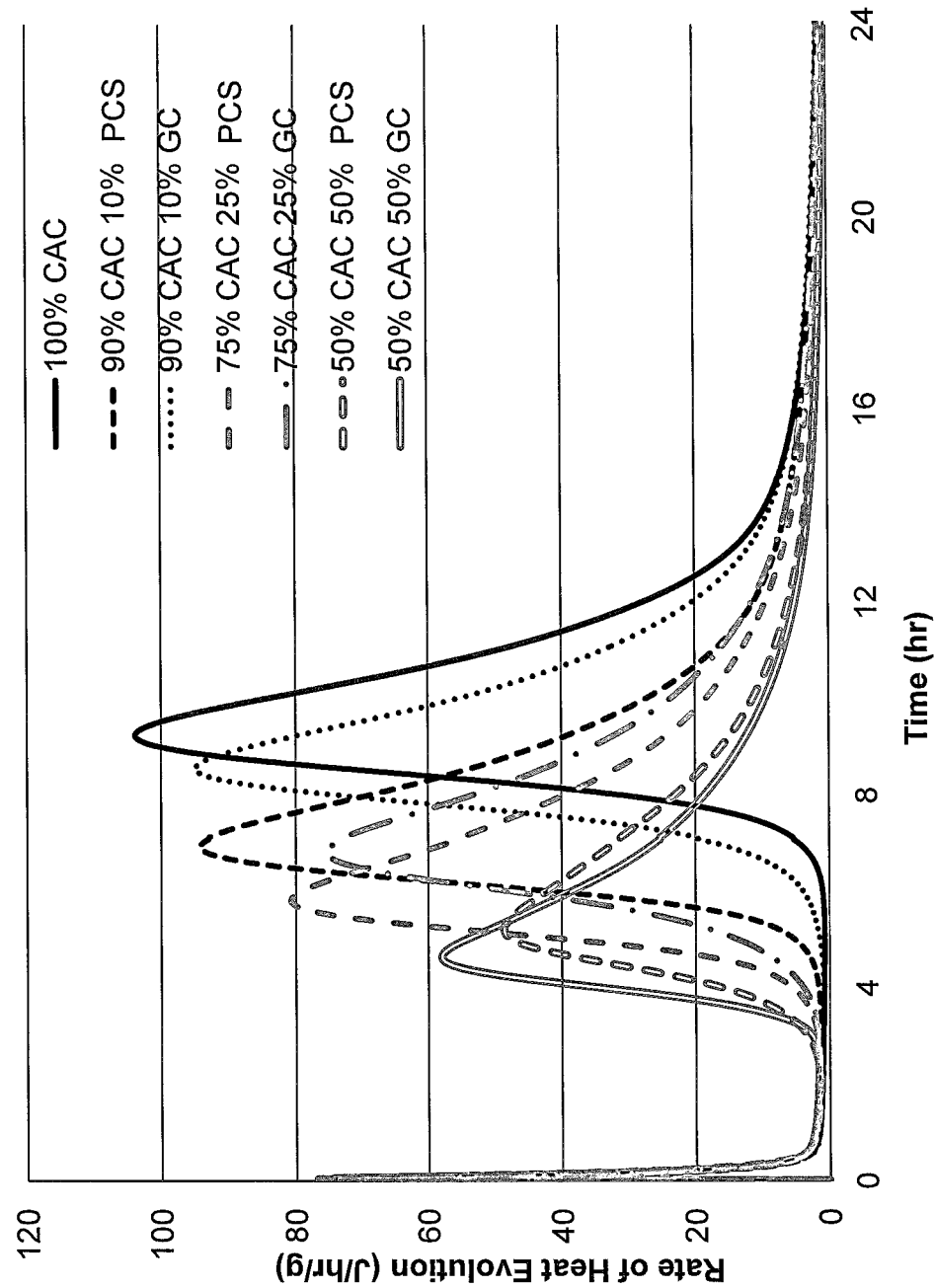

FIGS. 10A and 10B illustrate calorimeter data of the cement made from 100% CAC; CAC replacement with 10%, 25%, and 50% PCS; and CAC replacement with 10%, 25%, and 50% GC, further described in Example 3 herein.

Figure 11A:
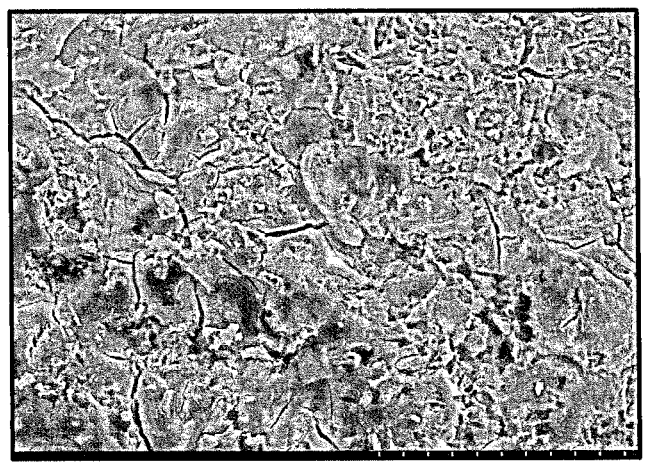
Figure 11B:
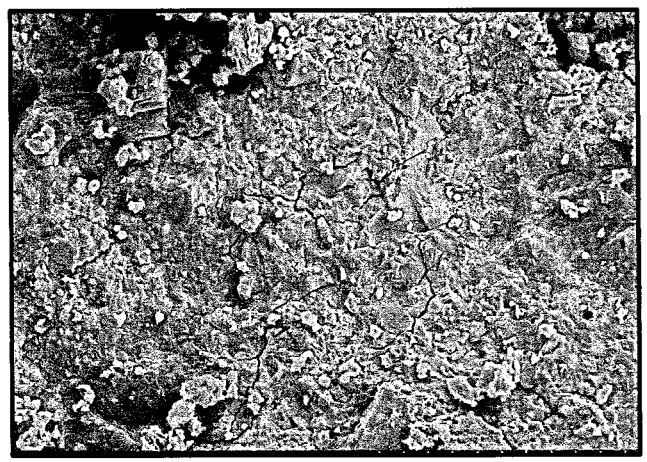
Figure 11C:
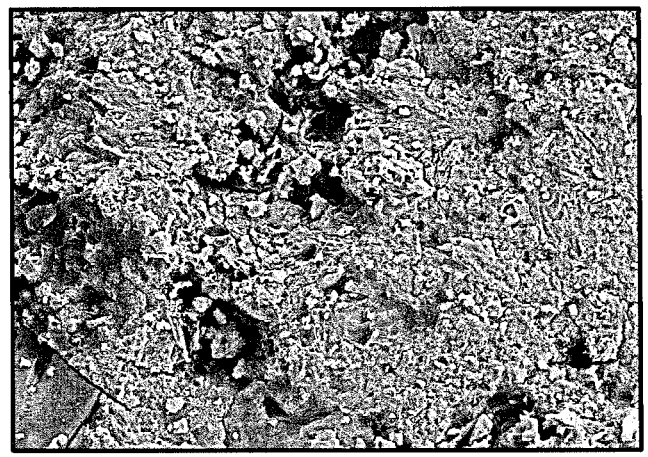

FIGS. 11A, 11B and 11C illustrate SEM image of the cement made from 100% CAC; CAC replacement with 25% PCS; and CAC replacement with 25% GC, further described in Example 3 herein.

DETAILED DESCRIPTION

Provided herein are compositions, methods and systems containing a composition comprising carbonates containing vaterite and calcium aluminate cement (CAC). As described herein, a waste gas stream comprising $CO_2$ may be processed to produce a composition comprising carbonates, bicarbonates, or a combination thereof. Water may be subsequently removed from the composition comprising carbonates, bicarbonates, or a combination thereof, to produce a concentrated composition, wherein the concentrated composition is concentrated with respect to the carbonates, bicarbonates, or the combination thereof. Whether dried completely, or containing residual water from the process (or from rinsing), the concentrated composition may be combined with a cement composition comprising calcium aluminates and used for various applications for which cement is used. These compositions comprising carbonate contain metastable forms, such as, but not limited to, vaterite which impart special properties to the cementititous compositions containing CAC as compared to CAC alone. Additionally, these compositions are environment friendly since they mitigate carbon dioxide emissions.

Before the invention is described in greater detail, it is to be understood that the invention is not limited to particular embodiments described herein as such embodiments may vary. It is also to be understood that the terminology used herein is for the purpose of describing particular embodiments only, and is not intended to be limiting, since the scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. Although any methods and materials similar or equivalent to those described herein may also be used in the practice or testing of the invention, representative illustrative methods and materials are now described.

A. Compositions

In one aspect, there are provided cementitious compositions including a composition of the invention comprising carbonates and calcium aluminate cement (CAC) (e.g., Ciment Fondu®). The "cementitious composition" or "cement composition" as used herein includes compositions that after combination with water set and harden into cement.

In some embodiments, the composition comprising carbonates comprises a metastable component selected from the group consisting of vaterite, amorphous calcium carbonate, and combination thereof. The composition comprising carbonates is combined with CAC to yield a material suitable for a building application. In some embodiments, the composition comprising carbonates is combined with CAC and other materials such as, but not limited to, aggregate, sand, other supplementary cementitious material known in the art, or rocks to yield a concrete material suitable for a building application. In some embodiments, the composition comprising carbonates is combined with CAC and Ordinary Portland Cement (OPC). In some embodiments, the composition comprising carbonates is combined with CAC, OPC, and gypsum. In some embodiments, the composition comprising carbonates is combined with CAC and gypsum. The aggregate may be synthetic or naturally occurring. In some embodiments, the aggregate is calcium carbonate made from the methods described herein. It is to be understood that other components such as sand to make mortar and other supplementary cementitious materials may be added to the cementitious composition of the invention.

In some embodiments, a binary mixture of the composition comprising carbonates and CAC is provided. In some embodiments, a ternary mixture comprising the composition comprising carbonates, CAC, and OPC or aggregate or gypsum, etc. is provided. In some embodiments, a quaternary mixture such as, the composition comprising carbonates, CAC, OPC, and gypsum is provided. The cementitious compositions and the CAC are described in detail herein.

CAC

"Calcium aluminate cement" (CAC), as used herein, includes hydraulic calcium aluminates. Some other names include, but are not limited to, "aluminous cement", "high-alumina cement", and "Ciment fondu". The active constituent of CAC may be monocalcium aluminate ($CaAl_2O_4$, $CaO.Al_2O_3$, or CA). It typically contains other calcium aluminates as well as a number of less reactive phases derived from impurities in the raw materials. CAC is typically used for properties common to those of Ordinary Portland Cement (OPC). CAC is made by fusing together a mixture of a calcium-bearing material (normally calcium oxide from limestone) and an aluminium-bearing material (normally bauxite for general purposes, or refined alumina for white and refractory cements). The liquified mixture cools to a basalt-like clinker which is ground alone to produce the finished product.

Some examples of the calcium aluminate cements and its composition ranges are provided in Table I below. These examples are for illustration purposes only and are in no way limiting to the scope of the invention. Other compositions for CAC are well known in the art and are well within the scope of the invention.

TABLE I

Some examples of composition ranges for calcium aluminate cements

| Grade | Color | $Al_2O_3$ | CaO | $SiO_2$ | $Fe_2O_3 + FeO$ | $TiO_2$ | MgO | $Na_2O$ | $K_2O$ |
|---|---|---|---|---|---|---|---|---|---|
| Standard low alumina | Grey or buff to black | 36-42 | 36-42 | 3-8 | 12-20 | <2 | ~1 | ~0.1 | ~0.15 |
| Low alumina, low iron | Light buff or grey to white | 48-60 | 36-42 | 3-8 | 1-3 | <2 | ~0.1 | ~0.1 | ~0.05 |
| Medium alumina | white | 65-75 | 25-35 | <0.5 | <0.5 | <0.05 | ~0.1 | <0.3 | ~0.05 |
| High alumina | white | ≥80 | <20 | <0.2 | <0.2 | <0.05 | <0.1 | <0.2 | ~0.05 |

CAC cement alone, however, may suffer from several disadvantages including, but not limited to, degradation over time, reduction in strength over time, cracks, less ability to withstand weather variations or temperature variations, etc. CAC alone may not be considered suitable for building materials. Typically, CAC over a longer period of time (hours to days to many years) loses strength due to the conversion of metastable phases of the hydration products (e.g. $CAH_{10}$) into stable hydration products (e.g. $C_3AH_6$), as described herein in Example 3. Due to the loss of water from metastable hydration products into stable hydration products, the stable hydration products form a smaller crystalline structure and take up less space which increases the porosity of the overall matrix and consequently reduces the strength. The mixture of CAC and ground calcium carbonate (GCC) was also found to suffer from low compressive strengths (e.g. described in Example 3 herein).

Applicants surprisingly and unexpectedly found that when the composition comprising carbonates as provided herein (e.g., precipitation material provided herein that has been dried e.g., spray dried, refined, milled, sieved, or the like), was mixed with CAC, it resulted in cement with long term durability and high compressive strength. The presence of metastable phases, such as, but not limited to, vaterite in the composition comprising carbonate facilitate formation of beneficial phases, such as, but not limited to, monocarboaluminates (MC) and hemicarboaluminates (HC) which result in higher compressive strength and better durability. It is contemplated that the morphology of vaterite may provide better packing during cementation and the spherical morphology of the vaterite may provide higher surface area (as compared to GC). The higher surface area may in turn lead to more nucleation sites for aluminate formation with CAC. Therefore, the presence of metastable phases such as, vaterite in the carbonate containing compositions results in the formation of the beneficial phases, such as, mono and hemicarboaluminates, and suppression of detrimental phases, such as $C_3AH_6$, thereby providing enhanced structural and mechanical properties to CAC.

In some embodiments, the cementitious compositions comprising CAC and the composition comprising carbonates set faster at any temperature as compared to CAC alone or CAC in combination with GC or CAC in combination with conventional cement such as OPC. As such, the cementitious compositions comprising CAC and the composition comprising carbonates are useful in applications in which a faster set time may be required, such as cold environment. In some embodiments, the cementitious compositions comprising CAC and the composition comprising carbonates may be used in sewer linings and other corrosive environments where chemical resistance needs are greater. In some embodiments, the cementitious compositions comprising CAC and the composition comprising carbonates may be used in extremely cold climates where high early strengths and high heats of formation may be desired. In some embodiments, the cementitious compositions comprising CAC and the composition comprising carbonates may be used in industrial flooring where heavy equipment traffic necessitates high abrasion resistance. In some embodiments, the cementitious compositions comprising CAC and the composition comprising carbonates may be used in repair work that requires greater early strength. The cementitious compositions comprising CAC and the composition comprising carbonates may develop a compressive strength at 1, 7, 28, 90, or longer days that may be greater than CAC alone or CAC mixed with OPC or GC.

Compositions Comprising Carbonates

The "composition comprising carbonate" or "carbonate containing compositions" or "carbonate compositions" as used herein includes calcium carbonate containing compositions. These compositions may further include calcium bicarbonate forms and carbonate and bicarbonate forms with other cations, such as, but not limited to sodium, magnesium, etc. In some embodiments, the composition comprising carbonate is itself cementitious which after combination with water set and harden into cement. In some embodiments, the composition comprising carbonate is partial cement substitute (PCS) which after combination with CAC and water set and harden into cement. The compositions comprising carbonate may be a self-cement or hydraulic cement composition, a supplementary cementitious material (SCM) or PCS, an aggregate, or combination thereof. The self-cementing composition may be chopped up after cementation to form aggregates.

In some embodiments, there are provided cementitious compositions comprising a composition comprising carbonate and CAC wherein the composition comprising carbonate is a self-cement composition. As used herein, "hydraulic cement" or "self-cement" includes a composition which sets and hardens after combining with water or a solution where the solvent is water. After hardening, the compositions retain strength and stability even under water. As a result of the immediately starting reactions, stiffening can be observed which may increase with time. After reaching a certain level, this point in time may be referred to as the start of setting. The consecutive further consolidation may be called setting, after which the phase of hardening begins. The compressive strength of the material may then grow steadily, over a period which ranges from a few days in the case of ultra-rapid-hardening cements, to several months or years in the case of other cements. Cements may be employed by themselves or in combination with aggregates, both coarse and fine, in which case the compositions may be referred to as concretes or mortars. Cements may also be cut and chopped to form aggregates. In embodiments where the composition comprising carbonate is a self-cement composition, the vaterite in the composition may transform to aragonite after coming in contact with water and interact with CAC at the same time to form beneficial carboaluminate phases.

In some embodiments, there are provided cementitious compositions comprising a composition comprising carbonate and CAC wherein the composition comprising carbonate is a PCS composition. The composition comprising carbonates may be used as a partial cement substitute (PCS). "PCS" as used herein includes the composition of the invention that may not be cementitious in and of itself but may interact with a cement composition, such as CAC, to produce a cured composition. As such, in some embodiments, PCS combined with CAC composition (e.g., CAC optionally containing other components such as, but not limited to, OPC, gypsum, etc.) produces a cured cement composition (or concrete if combined with concrete-forming materials such as fine aggregate, coarse aggregate, etc.) with enhanced properties (e.g., compressive strength) as described herein. In embodiments where the composition comprising carbonate is a PCS composition, the vaterite in the PCS composition may interact with CAC to form beneficial carboaluminate phases without itself transforming to aragonite.

It is to be understood that in both the self-cement and PCS compositions comprising carbonates, the vaterite interacts with CAC to form beneficial carboaluminate phases and results in enhanced structural and mechanical properties, as described herein.

In the absence of carbonate compositions, the CAC concrete may not be used in high alkaline environments, e.g. when it is exposed to solutions with a pH greater than 12 due to the dissolution of the aluminate hydrates. The aluminate hydrates may also decompose by a process called alkali hydrolysis. Alkali hydrolysis may be the result of the alkali decomposing the aluminate hydrate to form alkali aluminate and calcium hydroxide. Being Portland cement a highly basic material that contains alkalis, there may be alkali hydrolysis that may take place in the interface of the repair between OPC and CAC concrete. The carbonate composition provides a safer combination with CAC due to its low alkaline content. In some embodiments, the composition comprising carbonates has a wet paste pH of less than 12; or less than 11; or less than 10; or less than 9; or less than 8; or less than 7; or between 7-12; or between 7-11. In some embodiments, the compositions comprising carbonates as provided herein have a pH value of 12.5 or less. In some embodiments, the compositions comprising carbonates have a fresh paste value of 12.5 or less. The fresh paste includes the paste formed after mixing the composition with water. The lower pH of the composition comprising carbonates (further including CAC) makes it suitable for variety of applications including, but not limited to, artificial reefs, which are described in U.S. application Ser. No. 13/462,569, filed May 2, 2012, which is incorporated herein by reference in its entirety.

Provided herein are methods to make and use composition containing carbonates. Further detailed description for making and using such materials may be found in commonly assigned U.S. Pat. Nos. 7,735,274 and 8,062,418, both of which are herein incorporated by reference in their entirety.

The compositions comprising carbonates are formed by sequestering carbon dioxide from a carbon dioxide source such as waste streams, such as, but not limited to, flue gases from power plants or carbon dioxide emitted by cement plants and the like. In some embodiments, the composition comprising carbonates contains carbon derived from a fuel used by humans, e.g., carbon having a fossil fuel origin. For example, in some embodiments, the compositions comprising carbonates contain carbon that was released in the form of $CO_2$ from the combustion of fuel. In certain embodiments, the carbon sequestered in the composition is in the form of a carbonate compound. The sequestered carbon dioxide in the form of carbonate and/or bicarbonate is then treated with divalent cations, such as calcium optionally containing magnesium, to precipitate calcium carbonate and/or magnesium carbonate compound. Therefore, in certain embodiments, the compositions provided herein contain carbonate compounds where at least part of or whole of the carbon in the carbonate compounds is derived from a fuel used by humans, e.g., a fossil fuel. As such, production of the compositions of the invention results in the placement of $CO_2$ into a storage stable form in the cementitious composition. Production of the cementitious compositions of the invention thus results in the prevention of $CO_2$ gas from entering the atmosphere. The compositions of the invention provide for storage of $CO_2$ in a manner such that $CO_2$ sequestered (i.e., fixed) in the composition does not become part of the atmosphere.

The compositions contain carbonates and/or bicarbonates, which are in combination with a divalent cation such as calcium and/or magnesium. The carbonates and/or bicarbonates may be in solution, in solid form, or a combination of solution and solid form, e.g., a slurry. The carbonates and/or bicarbonates may contain carbon dioxide from a source of carbon dioxide; in some embodiments the carbon dioxide originates from the burning of fossil fuel, and thus some (e.g., at least 10, 50, 60, 70, 80, 90, 95%) or substantially all (e.g., at least 99, 99.5, or 99.9%) of the carbon in the carbonates and/or bicarbonates is of fossil fuel origin, i.e., of plant origin. As is known, carbon of plant origin has a different ratio of stable isotopes ($^{13}C$ and $^{12}C$) than carbon of inorganic origin, and thus the carbon in the carbonates and/or bicarbonates, in some embodiments, has a $\delta^{13}C$ of less than, e.g., -10‰, or less than -15‰, or less than -20‰, or less than -35‰, or less than -30‰, as described below.

In some embodiments, the compositions provided herein contain carbon from fossil fuel; because of its fossil fuel origin, the carbon isotopic fractionation ($\delta^{13}C$) value of such compositions may be different from that of compositions containing inorganic carbon, e.g., limestone. Typically, the plants from which fossil fuels are derived may preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range -30 to -20‰ and $\delta^{13}C$ values for methane may be as low as -20‰ to -40‰ or even -40‰ to -80‰. $\delta^{13}C$ values for atmospheric $CO_2$ are -10‰ to -7‰, for limestone +3‰ to -3‰, and for marine bicarbonate, 0‰.

The precipitation material that forms the composition of the invention, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}C‰ = [(^{13}C/^{12}C_{sample} - ^{13}C/^{12}C_{PDB\ standard})/(^{13}C/^{12}C_{TDB\ standard})] \times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Table II lists relative carbon isotope composition value ranges for relevant carbon sources for comparison.

Composition incorporating carbon from burning fossil fuels may reflect $\delta^{13}C$ values that are like those of plant derived material, i.e. less, than that which incorporates carbon from atmospheric or non-plant marine sources. Verification that the material produced by a carbon dioxide sequestering process is composed of carbon from burning fossil fuels can include measuring the $\delta^{13}C$ value of the resultant material and confirming that it is not similar to the values for atmospheric carbon dioxide, nor marine sources of carbon.

TABLE II

Relative carbon isotope composition ($\delta^{13}C$) values for carbon sources of interest.

| Carbon Source | $\delta^{13}C$ Range [‰] | $\delta^{13}C$ Average value [‰] |
|---|---|---|
| C3 Plants (most higher plants) | -23 to -33 | -27 |
| C4 Plants (most tropical and marsh plants) | -9 to -16 | -13 |
| Atmosphere | -6 to -7 | -6 |
| Marine Carbonate ($CO_3$) | -2 to +2 | 0 |
| Marine Bicarbonate ($HCO_3$) | -3 to +1 | -1 |
| Coal from Yallourn Seam in Australia[1] | -27.1 to -23.2 | -25.5 |
| Coal from Dean Coal Bed in Kentucky, USA[2] | -24.47 to -25.14 | -24.805 |

[1]Holdgate, G. R. et al., *Global and Planetary Change*, 65 (2009) pp. 89-103.
[2]Elswick, E. R. et al., *Applied Geochemistry*, 22 (2007) pp. 2065-2077.

As such, the $\delta^{13}C$ value of the composition comprising carbonates may serve as a fingerprint for a $CO_2$ gas source. The $\delta^{13}C$ value may vary from source to source (i.e., fossil fuel source), but the $\delta^{13}C$ value for composition provided herein may range between -9‰ to -35‰. In some embodiments, the $\delta^{13}C$ value for the composition is between -9‰ and -50‰, or between -15‰ and -40‰, or between -15‰ and -35‰, or between -15‰ and -25‰. In some embodiments, the $\delta^{13}C$ value for the composition is less than (i.e., more negative than)-9‰, -10‰, -11‰, -12‰, -13‰, -14‰, -15‰, -16‰, -17‰, -18‰, -19‰, -20‰, -21‰, -22‰, -23‰, -24‰, -25‰, -26‰, -27‰, -28‰, -29‰, -30‰, -31‰, -32‰, -33‰, -34‰, -35‰, -36‰, -37‰, -38‰, -39‰, -40‰, -41‰, -42‰, -43‰, -44‰, or -45‰. Any suitable method may be used for measuring the $\delta^{13}C$ value, methods including, but not limited to, mass spectrometry or off-axis integrated-cavity output spectroscopy (off-axis ICOS). One difference between the carbon isotopes is in their mass. Any mass-discerning technique sensitive enough to measure the amounts of carbon can be used to find ratios of the $^{13}C$ to $^{12}C$ isotope concentrations. Mass spectrometry is typically used to find $\delta^{13}C$ values. Commercially available are bench-top off-axis integrated-cavity output spectroscopy (off-axis ICOS) instruments that are able to determine $\delta^{13}C$ values as well. These values are obtained by the differences in the energies in the carbon-oxygen double bonds made by the $^{12}C$ and $^{13}C$ isotopes in carbon dioxide.

In some embodiments, the composition contains carbonates, e.g., magnesium and/or calcium carbonates that are characterized by having a $\delta^{13}C$ value less than −10‰. In some embodiments, the composition contains carbonates, e.g., magnesium and/or calcium carbonates that are characterized by having a $\delta^{13}C$ value less than −15‰, such as −16‰, such as less than −20‰, such as −21‰, such as −22‰, such as −23‰, such as −24‰, such as less than −25‰. In some embodiments, the composition contains organic matter or fossil fuel burning originated carbonates, that are characterized by having a $\delta^{13}C$ value less than −10‰, such as less than −15‰, such as −16‰, such as less than −20‰, such as −21‰, such as −22‰, such as −23‰, such as −24‰, such as less than −25‰. In some embodiments, the composition contains organic matter or fossil fuel burning originated carbonates, e.g., calcium carbonates that are characterized by having a $\delta^{13}C$ value less than −10‰. In some embodiments, the composition contains organic matter or fossil fuel burning originated carbon, e.g., calcium carbonates that are characterized by having a $\delta^{13}C$ value less than −15‰ or between −15‰ to −40‰.

In some embodiments, there is provided a cementitious composition comprising a composition comprising carbonate and CAC wherein the composition comprising carbonate comprises a metastable component selected from the group consisting of vaterite, amorphous calcium carbonate, and combination thereof and wherein the composition comprising carbonate has a $\delta^{13}C$ value less than −12.0‰ or between −12‰ to −40‰. In some embodiments, there is provided a cementitious composition comprising a composition comprising carbonate and CAC wherein the composition comprising carbonate comprises a metastable component selected from the group consisting of vaterite, amorphous calcium carbonate, and combination thereof, wherein the cementitious composition a $\delta^{13}C$ value less than −12.0‰ or between −12‰ to −40‰, and wherein the cementitious composition has a wet paste pH of less than 12. In some embodiments, in the foregoing embodiments, the composition comprising carbonate is a self-cement composition. In some embodiments, in the foregoing embodiments, the composition comprising carbonate is a PCS composition.

In some embodiments, the ratio of the calcium to carbonate ions may be varied to form the composition comprising carbonates with desired surface charge. In some embodiments, the ratio of calcium or calcium ion with the carbonate or the carbonate ion in the composition (calcium:carbonate) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is in a range of 1.2:1 to 1.8:1; or is 1:1; or is 1.5:1; or is 2:1; or is 2.5:1; or is 3:1; or is 3.5:1; or is 4:1; or is 4.5:1; or is 5:1. In some embodiments, the ratio of calcium:carbonate in the composition is 1.5:1, or 1:1, or 2:1.

In some embodiments, there is provided a cementitious composition comprising a composition comprising carbonate and CAC wherein the composition comprising carbonate comprises a metastable component selected from the group consisting of vaterite, amorphous calcium carbonate, and combination thereof and wherein the composition comprising carbonate has a ratio of calcium:carbonate 1.5:1, or 1:1, or 2:1. In some embodiments, there is provided a cementitious composition comprising a composition comprising carbonate and CAC wherein the composition comprising carbonate comprises a metastable component selected from the group consisting of vaterite, amorphous calcium carbonate, and combination thereof, wherein the composition comprising carbonate has a ratio of calcium:carbonate 1.5:1, or 1:1, or 2:1, and wherein the composition comprising carbonate has a $\delta^{13}C$ value less than −12.0‰ or between −12‰ to −40‰. In some embodiments, there is provided a cementitious composition comprising a composition comprising carbonate and CAC wherein the composition comprising carbonate comprises a metastable component selected from the group consisting of vaterite, amorphous calcium carbonate, and combination thereof, wherein the composition comprising carbonate has a ratio of calcium:carbonate 1.5:1, or 1:1, or 2:1, and wherein the cementitious composition has a wet paste pH of less than 12. In some embodiments, there is provided a cementitious composition comprising a composition comprising carbonate and CAC wherein the composition comprising carbonate comprises a metastable component selected from the group consisting of vaterite, amorphous calcium carbonate, and combination thereof, wherein the composition comprising carbonate has a ratio of calcium:carbonate 1.5:1, or 1:1, or 2:1, wherein the cementitious composition a $\delta^{13}C$ value less than −12.0‰ or between −12‰ to −40‰, and wherein the cementitious composition has a wet paste pH of less than 12. In some embodiments, in the foregoing embodiments, the composition comprising carbonate is a self-cement composition. In some embodiments, in the foregoing embodiments, the composition comprising carbonate is a PCS composition.

In some embodiments, the composition comprising carbonates may further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the composition comprising carbonates in un-derivatized form. In some embodiments, the composition comprising carbonates may further include one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in a given composition of the invention may vary, and in certain embodiments the amounts of these components range from 0.1 to 1% w/w; or 0.1 to 10% w/w; or 1 to 50% w/w, or 10% w/w to 50% w/w, such as 2 to 10% w/w. In some embodiments, these components present in the composition comprising carbonates are in a non-leachable form such that when a leachate is formed from the composition, no more than 2 mg/L of the component is leached from the composition.

In some embodiments, there is provided a cementitious composition comprising a composition comprising carbonates and CAC wherein the composition comprising carbonates comprises a metastable component selected from the group consisting of vaterite, amorphous calcium carbonate (ACC), and combination thereof. The carbonate compounds of the composition may be metastable carbonate compounds including, but not limited to, vaterite and/or amorphous calcium carbonate. The carbonate compound containing compositions of the invention may include precipitated crystalline and/or amorphous carbonate compounds. Specific carbonate minerals of interest include, but are not limited to: calcium carbonate minerals, magnesium carbonate minerals and calcium magnesium carbonate minerals. In addition to vaterite and/or ACC, the calcium carbonate minerals of interest include, but are not limited to: calcite ($CaCO_3$), aragonite ($CaCO_3$), and ikaite ($CaCO_3.6H_2O$). Magnesium carbonate minerals of interest include, but are not limited to: magnesite ($MgCO_3$), barringtonite ($MgCO_3.2H_2O$), nesquehonite ($MgCO_3.3H_2O$), lanfordite ($MgCO_3.5H_2O$) and amorphous magnesium calcium carbonate ($MgCO_3.nH_2O$). Calcium magnesium carbonate minerals of interest include, but are not limited to dolomite ($CaMgCO_3$), huntite ($CaMg_3(CO_3)_4$) and sergeevite ($Ca_2Mg_{11}(CO_3)_{13}.H_2O$). In certain embodiments, non-carbonate compounds like brucite ($Mg(OH)_2$) may also form in combination with the minerals listed above. In some embodiments, the metastable carbonate compounds (and may include one or more metastable hydroxide compounds) upon contact with fresh water dissolve and re-precipitate into other fresh water stable compounds, e.g., minerals such as aragonite and/or calcite.

Calcium carbonate in the composition in addition to vaterite may include, but not limited to: a precursor phase of vaterite, a precursor phase of aragonite, an intermediary phase that is less stable than calcite, polymorphic forms in between these polymorphs, and combination thereof. Vaterite may be present in the cementitious composition in a monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite may comprise nanoclusters of vaterite and the precursor form of aragonite may comprise sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

Ratios of the calcium and magnesium compounds in precipitation material may be determined using X-ray diffraction (XRD), Raman spectroscopy, or a combination of both. For example, the ratio of vaterite to calcite (v/c ratio) in precipitation material comprising both polymorphs may be determined by comparison of Raman peak intensities corresponding to vaterite and calcite, respectively. Such a ratio may be helpful in determining the cementing and/or self-cementing property of the precipitation material as well as its interaction with aluminate. The precipitation material comprising vaterite, has a higher cementing and/or self-cementing and/or interaction with aluminate capacity.

In some embodiments, the compositions of the invention are non-medical or are not for medical procedures. In some embodiments, the compositions of the invention are synthetic compositions and are not naturally occurring.

In some embodiments of the aspects and embodiments described herein, the compositions comprising carbonates provided herein includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 95% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 30% w/w to 99% w/w vaterite; or from 30% w/w to 95% w/w vaterite; or from 30% w/w to 90% w/w vaterite; or from 30% w/w to 80% w/w vaterite; or from 30% w/w to 70% w/w vaterite; or from 30% w/w to 60% w/w vaterite; or from 30% w/w to 50% w/w vaterite; or from 30% w/w to 40% w/w vaterite; or from 50% w/w to 99% w/w vaterite; or from 50% w/w to 95% w/w vaterite; or from 50% w/w to 90% w/w vaterite; or from 50% w/w to 80% w/w vaterite; or from 50% w/w to 70% w/w vaterite; or from 50% w/w to 60% w/w vaterite; or from 70% w/w to 99% w/w vaterite; or from 70% w/w to 95% w/w vaterite; or from 70% w/w to 90% w/w vaterite; or from 70% w/w to 80% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or from 90% w/w to 95% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. In some embodiments of the aspects and embodiments described herein, the compositions comprising carbonates provided herein includes more than 40 wt % of vaterite, or more than 50 wt % of vaterite, or between 40-99 wt % vaterite or between 50-99 wt % vaterite or between 50-99.9 wt % vaterite.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof, and wherein the composition comprising carbonates comprises at least 50 wt % (or w/w %) vaterite or between 50-99 wt % vaterite. In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates comprises at least 50 wt % (or w/w %) vaterite or between 50-99 wt % vaterite, and wherein the composition comprising carbonates has a $\delta^{13}C$ value less than −10.0‰ or between −10‰ to −40‰. In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates comprises at least 50 wt % (or w/w %) vaterite or between 50-99 wt % vaterite, wherein the composition comprising carbonates has a $\delta^{13}C$ value less than −10.0‰ or between −10‰ to −40‰, and wherein the composition comprising carbonates has a wet paste pH of less than 12. In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates comprises at least 50 wt % (or w/w %) vaterite or between 50-99 wt % vaterite, and wherein the composition comprising carbonates has a wet paste pH of less than 12. In some embodiments, in the foregoing compositions, the cementitious composition after combination with water, setting, and hardening has a compressive strength greater than the compressive strength of CAC alone or the compressive strength of a cementitious composition comprising ground calcium carbonate (GC or GCC) with CAC. In some embodiments, in the foregoing compositions, the cementitious composition after combination with water, setting, and hardening has a compressive strength more by at least 10 MPa compared to the compressive strength of CAC alone or the compressive strength of a cementitious composition comprising ground calcium carbonate (GC or GCC) with CAC. In some embodiments, the foregoing compositions upon combination with water, setting, and hardening, have a compressive strength of at least 10 MPa (megapascal) or in some embodiments, between 10-80 MPa or between 10-55 MPa or 10-35 MPa. In some embodiments, in the foregoing compositions, the composition comprising carbonates is a self-cement composition. In some embodiments, in the foregoing compositions, the composition comprising carbonates is a PCS composition.

In some embodiments of the aspects and the embodiments described herein and above, the composition comprising carbonates includes at least 1% w/w amorphous calcium carbonate (ACC); or at least 2% w/w ACC; or at least 5% w/w ACC; or at least 10% w/w ACC; or at least 50% w/w ACC; or at least 80% w/w ACC; or at least 90% w/w ACC; or from 1% w/w to 90% w/w ACC; or from 1% w/w to 80% w/w ACC; or from 1% w/w to 70% w/w ACC; or from 1% w/w to 60% w/w ACC; or from 1% w/w to 50% w/w ACC; or from 1% w/w to 40% w/w ACC; or from 1% w/w to 30% w/w ACC; or from 1% w/w to 20% w/w ACC; or from 1% w/w to 10% w/w ACC; or from 5% w/w to 90% w/w ACC; or from 5% w/w to 80% w/w ACC; or from 5% w/w to 70% w/w ACC; or from 5% w/w to 60% w/w ACC; or from 5% w/w to 50% w/w ACC; or from 5% w/w to 40% w/w ACC; or from 5% w/w to 30% w/w ACC; or from 5% w/w to 20% w/w ACC; or from 5% w/w to 10% w/w ACC; or from 10% w/w to 90% w/w ACC; or from 10% w/w to 80% w/w ACC; or from 10% w/w to 70% w/w ACC; or from 10% w/w to 60% w/w ACC; or from 10% w/w to 50% w/w ACC; or from 10% w/w to 40% w/w ACC; or from 10% w/w to 30% w/w ACC; or from 10% w/w to 20% w/w ACC; or from 30% w/w to 90% w/w ACC; or from 30% w/w to 80% w/w ACC; or from 30% w/w to 70% w/w ACC; or from 30% w/w to 60% w/w ACC; or from 30% w/w to 50% w/w ACC; or from 30% w/w to 40% w/w ACC; or from 50% w/w to 90% w/w ACC; or from 50% w/w to 80% w/w ACC; or from 50% w/w to 70% w/w ACC; or from 50% w/w to 60% w/w ACC; or from 70% w/w to 90% w/w ACC; or from 70% w/w to 80% w/w ACC; or from 70% w/w to 75% w/w ACC; or 1% w/w ACC; or 2% w/w ACC; or 5% w/w ACC; or 10% w/w ACC; or 20% w/w ACC; or 30% w/w ACC; or 40% w/w ACC; or 50% w/w ACC; or 60% w/w ACC; or 70% w/w ACC; or 80% w/w ACC; or 90% w/w ACC.

In some embodiments of the aspects and the embodiments described herein, the composition comprising carbonates includes the vaterite in a range of 10% w/w to 99% w/w and the ACC in a range of 1% w/w to 90% w/w; or the vaterite is in a range of 10% w/w to 90% w/w and the ACC is in a range of 10% w/w to 90% w/w; or the vaterite is in a range of 10% w/w to 80% w/w and the ACC is in a range of 20% w/w to 90% w/w; or the vaterite is in a range of 10% w/w to 70% w/w and the ACC is in a range of 30% w/w to 90% w/w; or the vaterite is in a range of 10% w/w to 60% w/w and the ACC is in a range of 40% w/w to 90% w/w; or the vaterite is in a range of 10% w/w to 50% w/w and the ACC is in a range of 50% w/w to 90% w/w; or the vaterite is in a range of 10% w/w to 40% w/w and the ACC is in a range of 60% w/w to 90% w/w; or the vaterite is in a range of 10% w/w to 30% w/w and the ACC is in a range of 70% w/w to 90% w/w; or the vaterite is in a range of 10% w/w to 20% w/w and the ACC is in a range of 80% w/w to 90% w/w. It is to be understood that the percentage of each of the components in the composition will be in such a way that the total percentage of the components in the composition may not exceed a total of 100% by wt.

The cementitious compositions comprising compositions comprising carbonates and CAC show unexpected properties, such as, high compressive strength, high durability, high temperature tolerance, and less maintenance costs. In addition, in some embodiments, when the $CO_2$ is sequestered from flue gas or from carbonated brines into the calcium carbonate forms of the invention, the compositions reduce carbon footprint and provide cleaner environment.

In some embodiments of the aspects and the embodiments described herein, the cementitious compositions after setting, and hardening have a compressive strength of at least 10 MPa; at least 14 MPa; or at least 16 MPa; or at least 18 MPa; or at least 20 MPa; or at least 25 MPa; or at least 30 MPa; or at least 35 MPa; or at least 40 MPa; or at least 50 MPa; or at least 60 MPa; or at least 70 MPa; or at least 80 MPa; or at least 90 MPa; or at least 100 MPa; or from 10-100 MPa; or from 10-80 MPa; or from 10-70 MPa; or from 10-60 MPa; or from 10-55 MPa; or from 10-50 MPa; or from 10-40 MPa; or from 10-30 MPa; or from 10-20 MPa; or from 10-15 MPa; or from 14-100 MPa; or from 14-80 MPa; or from 14-75 MPa; or from 14-70 MPa; or from 14-65 MPa; or from 14-60 MPa; or from 14-55 MPa; or from 14-50 MPa; or from 14-45 MPa; or from 14-40 MPa; or from 14-35 MPa; or from 14-30 MPa; or from 14-25 MPa; or from 14-20 MPa; or from 14-18 MPa; or from 14-16 MPa; or from 20-100 MPa; or from 20-90 MPa; or from 20-80 MPa; or from 20-75 MPa; or from 20-70 MPa; or from 20-65 MPa; or from 20-60 MPa; or from 20-55 MPa; or from 20-50 MPa; or from 20-45 MPa; or from 20-40 MPa; or from 20-35 MPa; or from 20-30 MPa; or from 20-25 MPa; or from 30-100 MPa; or from 30-75 MPa; or from 30-50 MPa; or from 50-100 MPa; or from 50-75 MPa; or from 60-90 MPa; or from 70-100 MPa; or from 80-90 MPa; or 14 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 10 MPa to 55 MPa; or 14 MPa to 40 MPa; or 17 MPa to 40 MPa; or 20 MPa to 40 MPa; or 30 MPa to 40 MPa; or 35 MPa to 40 MPa.

In some embodiments, the compressive strengths described herein are the compressive strengths after 1 day, or 3 days, or 7 days, or 28 days, or 56 days, or longer. For example, in some embodiments, the cementitious composition or the composition comprising the composition comprising carbonates and the CAC, after setting, and hardening have a compressive strength between 10-55 MPa after 1 day. In some embodiments, the cementitious composition or the composition comprising the composition comprising carbonates and the CAC, after setting, and hardening have a compressive strength between 10-55 MPa after 7 days. In some embodiments, the cementitious composition or the composition comprising the composition comprising carbonates and the CAC, after setting, and hardening have a compressive strength between 10-55 MPa after 28 days or longer. In some embodiments, the cementitious composition or the composition comprising the composition comprising carbonates and the CAC, after setting, and hardening have a compressive strength between 10-55 MPa after months or years.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof and wherein the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates comprises at least 50 wt % (or w/w %) vaterite or between 50-99 wt % vaterite, and wherein the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, there is provided a cementitious composition comprising a composition comprising carbonates and CAC, wherein the composition comprising carbonates comprises a metastable component selected from the group consisting of vaterite, amorphous calcium carbonate, and combination thereof, wherein the composition comprising carbonates comprises at least 50 wt % (or w/w %) vaterite or between 50-99 wt % vaterite, wherein the composition comprising carbonates has a $\delta^{13}C$ value less than −10.0‰ or between −10‰ to −40‰, and wherein the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates has a $\delta^{13}C$ value less than −10.0‰ or between −10‰ to −40‰, and wherein the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates comprises at least 50 wt % (or w/w %) vaterite or between 50-99 wt % vaterite, wherein the composition comprising carbonates has a $\delta^{13}C$ value less than −10.0‰ or between −10‰ to −40‰, wherein the composition comprising carbonates has a wet paste pH of less than 12, and wherein the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof, wherein the composition comprising carbonates has a $\delta^{13}C$ value less than −10.0‰ or between −10‰ to −40‰, wherein the composition comprising carbonates has a wet paste pH of less than 12, and wherein the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, there is provided a cementitious composition comprising a composition comprising carbonates and CAC wherein the composition comprising carbonates comprises a metastable component selected from the group consisting of vaterite, amorphous calcium carbonate, and combination thereof, and wherein the composition comprising carbonates comprises at least one of the following:

a) at least 50 wt % (or w/w %) vaterite or between 50-99 wt % vaterite;

b) a $\delta^{13}C$ value less than −10.0‰ or between −10‰ to −40‰;

c) a wet paste pH of less than 12; and combinations thereof.

In some embodiments, in the foregoing compositions, the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

In some embodiments, in the foregoing compositions, the composition comprising carbonates is a self-cement composition. In some embodiments, in the foregoing compositions, the composition comprising carbonates is a PCS composition.

In some embodiments, the composition comprising carbonate is at least one of the composition shown in Table III below. This composition is then mixed with CAC to form the cementitious compositions of the invention.

TABLE III

| composition | Metastable component | a) | b) | c) |
|---|---|---|---|---|
| 1 | x | x | | |
| 2 | x | | x | |
| 3 | x | | | x |
| 4 | x | x | x | |
| 5 | x | x | | x |
| 6 | x | x | x | x |
| 7 | x | | x | x |

In some embodiments, in any of the foregoing compositions shown in Table III, the cementitious composition after combination with water, setting, and hardening has a compressive strength of at least 10 MPa or between 10-55 MPa or the cementitious composition after combination with water, setting, and hardening has a compressive strength greater than the compressive strength of CAC alone or CAC in combination with GC or the cementitious composition after combination with water, setting, and hardening has a compressive strength more by at least 10 MPa or by between 10-25 MPa compared to the compressive strength of CAC alone or CAC in combination with GC.

The foregoing cementitious compositions comprising carbonate compositions and CAC exhibit at least one of the following properties including, but not limited to, high reactivity of carbonate with aluminate phases, formation of monocarboaluminates, formation of hemicarboaluminates, high compressive strength, high durability over long time period, high mechanical and structural properties, as compared to CAC alone or CAC mixed with GC (as illustrated in examples).

In some embodiments, the composition comprising carbonate is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the cement yet providing smaller reactive particles for early reaction. In such instances, the average particle size of the larger size class can be upwards of 1000 microns (1 mm). In some embodiments, the composition comprising carbonate is a particulate composition with an average particle size of 0.1-1000 microns; or 0.1-500 microns; or 0.1-200 microns; or 0.1-100 microns; or 0.1-80 microns; or 0.1-50 microns; or 0.1-40 microns; or 0.1-30 microns; or 0.1-20 microns; or 0.1-10 microns; or 0.1-5 microns; or 0.5-100 microns; or 0.5-70 microns; or 0.5-50 microns; or 0.5-10 microns; or 0.5-5 microns; or 1-100 microns; or 1-70 microns; or 1-50 microns; or 1-10 microns; or 1-5 microns; or 3-100 microns; or 3-50 microns; or 3-10 microns; or 3-8 microns; or 5-100 microns; or 5-50 microns; or 5-10 microns; or 5-8 microns; or 8-100 microns; or 8-50 microns; or 8-30 microns; or 8-20 microns; or 8-10 microns; or 10-100 microns; or 10-50 microns; or 10-30 microns; or 20-100 microns; or 20-50 microns; or 20-40 microns; or 40-100 microns; or 40-50 microns; or 50-100 microns; or 50-70 microns; or 60-100 microns; or 60-70 microns; or 70-100 microns; or 80-100 microns; or 0.1 microns; or 0.5 microns; or 1 microns; or 2 microns; or 3 microns; or 4 microns; or 5 microns; or 8 microns; or 10 microns; or microns; or 20 microns; or 30 microns; or 40 microns; or 50 microns; or 60 microns; or 70 microns; or 80 microns; or 100 microns. For example, in some embodiments, the composition comprising carbonate is a particulate composition with an average particle size of 0.1-30 micron; 0.1-20 micron; or 0.1-15 micron; or 0.1-10 micron; or 0.1-8 micron; or 0.1-5 micron; or 1-5 micron; or 5-10 micron.

In certain embodiments, the cementitious composition may further include an aggregate. Aggregate may be included in the composition to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 10 to 80%, such as 40 to 70% and including 50 to 70% w/w of the total composition made up of both the composition and the aggregate.

In some embodiments, the cementitious compositions provided herein include 5-90 wt % 5-80 wt % or 5-75 wt % or 5-60 wt % or 5-50 wt % or 5-25 wt % or 5-20 wt % or 5-10 wt % or 10-90 wt % or 10-75 wt % or 10-60 wt % or 10-50 wt % or 10-25 wt % or 10-20 wt % or 25-90 wt % or 25-75 wt % or 25-60 wt % or 25-50 wt % or 50-90 wt % or 50-75 wt % or 50-60 wt % or 75-90 wt % of the composition comprising carbonate and 0.1-95 wt % or 1-95 wt % or 5-80 wt % or 5-75 wt % or 5-50 wt % or 5-25 wt % or 25-95 wt % or 25-80 wt % or 25-75 wt % or 25-60 wt % or 25-50 wt % or 20-95 wt % or 20-80 wt % or 20-60 wt % or 20-50 wt % or 50-95 wt % or 50-80 wt % or 50-75 wt % or 50-60 wt % or 40-95 wt % or 40-80 wt % or 40-75 wt % or 40-60 wt % or 40-50 wt % of CAC. In some embodiments, the cementitious compositions provided herein include 5-90 wt % or 5-75 wt % or 5-60 wt % or 5-50 wt % or 5-25 wt % of the composition comprising carbonate, 5-50 wt % or 5-25 wt % of sand, and 50-90 wt % of CAC. In some embodiments, the cementitious compositions provided herein include 5-90 wt % or 5-75 wt % or 5-60 wt % or 5-50 wt % or 5-25 wt % of the composition comprising carbonate, 5-50 wt % or 5-25 wt % of aggregate, and 50-90 wt % of the CAC. In some embodiments, the cementitious compositions provided herein include 5-90 wt % or 5-75 wt % or 5-60 wt % or 5-50 wt % or 5-25 wt % of the composition comprising carbonate; 5-50 wt % or 5-25 wt % of sand; 5-50 wt % or 5-25 wt % of aggregate; and 40-90 wt % of the CAC. In some embodiments, the cementitious compositions provided herein include 5-90 wt % or 5-75 wt % or 5-60 wt % or 5-50 wt % or 5-25 wt % of the composition comprising carbonate, 5-50 wt % or 5-25 wt % of OPC, and 40-90 wt % of the CAC. In some embodiments, the cementitious compositions provided herein include 5-90 wt % or 5-75 wt % or 5-60 wt % or 5-50 wt % or 5-25 wt % of the composition comprising carbonate, 5-50 wt % or 5-25 wt % of gypsum, and 40-90 wt % of the CAC. In some embodiments, the cementitious compositions provided herein include 5-90 wt % or 5-75 wt % or 5-60 wt % or 5-50 wt % or 5-25 wt % of the composition comprising carbonate, 5-50 wt % or 5-25 wt % of OPC, 5-50 wt % or 5-25 wt % of gypsum, and 40-90 wt % of the CAC.

In some embodiments, the compositions provided herein include between 5-95 vol %, or between 5-80 vol %, or between 5-75 vol %, or between 5-50 vol %, of the composition comprising carbonate and up to 5 vol %, or between 0.1-5 vol %, or between 0.5-5 vol %, or between 1-5 vol %, or between 1.5-5 vol %, or between 5-25 vol %, or between 5-50 vol %, of CAC. The remaining percentages in the compositions may be sand, aggregate, OPC, gypsum, or combination thereof.

It is to be understood that all the wt % s or vol % s in the compositions do not exceed 100 wt % or vol % of the total composition.

In some embodiments, the composition of the invention may further include Ordinary Portland Cement (OPC) or Portland cement clinker. The amount of Portland cement component may vary and range from 10 to 80% w/w; or 10 to 70% w/w; or 10 to 60% w/w; or 10 to 50% w/w; or 10 to 40% w/w; or 10 to 30% w/w; or 10 to 20% w/w; or 20 to 80% w/w; or 20 to 70% w/w; or to 60% w/w; or 20 to 50% w/w; or 20 to 40% w/w; or 20 to 30% w/w; or 30 to 80% w/w; or 30 to 70% w/w; or 30 to 60% w/w; or 30 to 50% w/w; or 30 to 40% w/w; or 40 to 80% w/w; or 40 to 70% w/w; or 40 to 60% w/w; or 40 to 50% w/w; or 50 to 80% w/w; or 50 to 70% w/w; or 50 to 60% w/w; or 60 to 80% w/w; or 60 to 70% w/w; or 70 to 90% w/w; or 70 to 80% w/w. For example, the composition may include a blend of 75% OPC and 25% composition of the invention (containing composition comprising carbonate and CAC); or 80% OPC and 20% composition of the invention; or 85% OPC and 15% composition of the invention; or 90% OPC and 10% composition of the invention; or 95% OPC and 5% composition of the invention; or 25% OPC and 75% composition of the invention.

The composition comprising carbonate may be derived from, e.g., precipitated from, absorbing solution and/or water. As the $CO_2$ sequestering products are precipitated from water, they may include one or more additives that are present in the water from which they are derived. For example, where the water is salt water, the composition may include one or more compounds found in the salt water source. These compounds may be used to identify the solid precipitations of the compositions that come from the salt water source, where these identifying components and the amounts thereof are collectively referred to herein as a saltwater source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements would generally be present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

The cementitious composition and/or the composition comprising carbonate may be viewed as low-carbon footprint compositions. Low-carbon footprint compositions have a reduced carbon footprint as compared to corresponding compositions that lack the $CO_2$ sequestering (where corresponding herein means the identical composition but for the presence of the $CO_2$ sequestering as in the composition of the invention). Using any convenient carbon footprint calculator, the magnitude of carbon footprint reduction of the compositions of the invention as compared to corresponding compositions that lack the $CO_2$ sequestering may be 5% or more, such as 10% or more, including 25%, 50%, 75% or even 100% or more. In certain embodiments, the low-carbon footprint cementitious compositions of the invention are carbon neutral, in that they have substantially no, if any, calculated carbon footprint, e.g., as determined using any convenient carbon footprint calculator that is relevant for a particular composition of interest. Carbon neutral compositions of the invention include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral compositions have 0 or negative lbs $CO_2$/cu yd material, such as negative 1 or more, e.g., negative 3 or more lbs $CO_2$/cu yd material. In some instances, the low carbon footprint compositions have a significantly negative carbon footprint, e.g., −100 or more lbs $CO_2$/cu yd or less.

The surface area of the components making up the composition of the invention may vary. Given cement may have an average surface area sufficient to provide for a liquid/solid ratio upon combination with a liquid to produce a settable composition ranging from 0.5 $m^2$/gm to 50 $m^2$/gm, 0.75 to 20 $m^2$/gm, or 0.80 to 10 $m^2$/gm. In some embodiments, the surface area of the cementitious composition and/or the composition comprising carbonate ranges from 10 to 25 $m^2$/gm, 10 to 20 $m^2$/gm, or 10 to 15 $m^2$/gm, or 15 to 25 $m^2$/gm, as determined using the surface area determination protocol described in Breunner, Emmit, and Teller (1953). In some embodiments, the surface area of the carbonate compositions is greater than the surface area of GC due to the spherical morphology of vaterite. The larger surface area of the vaterite may provide larger number of nucleation sites for aluminate formation thereby resulting in high compressive strengths.

Binary mixtures (or combined compositions) of carbonate compositions and CAC may have up to 75 wt % or up to 50 wt % carbonate composition by weight, the remainder of binding material being CAC. Ternary mixtures, quaternary mixtures, quinary mixtures, senary mixtures, septenary mixtures, etc. (alternatively, combined compositions such as ternary combined compositions, quaternary combined compositions, etc.) may also have up to 75 wt % or up to 50 wt % carbonate composition in combination with CAC and admixtures, including, but not limited to, gypsum, fly ash, slag, and/or metakaolin. Other additives (e.g., GLENIUM® 7500) that may be used in cement and concrete compositions may be negligible with respect to the CAC, carbonate composition, and for example, admixtures such as gypsum, fly ash, slag, and metakaolin. For example, in some embodiments, a binary mixture comprising CAC and carbonate composition may have at least 10, 15, 20, 25, 30, 35, 40, 45, 50, 55, 60, 70% by weight carbonate composition, the remainder being primarily CAC. Combinations of the foregoing ranges (e.g., at least 5% carbonate composition by weight and less than 25% carbonate composition by weight) may also be used to describe these compositions.

Ternary mixtures (as well as quaternary mixtures, quinary mixtures, etc.) are with respect to the CAC component and the bulk additive, which bulk additive includes carbonate composition in combination with any admixtures, including, but not limited to OPC, gypsum, fly ash, slag, and/or metakaolin. In such ternary mixtures (as well as quaternary mixtures, quinary mixtures, etc.), the bulk additive (e.g., carbonate composition in combination with one of gypsum, fly ash, slag, or metakaolin) may be at least 10, 15, 20, 25, 30, 35, 40, 45, 50, 55, 60, 70% by weight of the ternary mixture, the remainder being CAC. In some embodiments, the bulk additive (e.g., carbonate composition in combination with one of gypsum, fly ash, slag, or metakaolin) may be less than 10, 15, 20, 25, 30, 35, 40, 45, 50, 55, 60, 70% by weight of the ternary mixture, the remainder being CAC. Combinations of the foregoing ranges (e.g., at least 5% and less than 25% bulk additive by weight of the ternary mixture) may also be used to describe these compositions.

For example, a composition may comprise 70% ordinary Portland cement, 10% calcium aluminate cement, and 20% PCS, wherein the ratio of PCS to OPC is 1:3, optionally with aggregates and/or admixtures. For example, a composition may comprise 70% gypsum, 10% calcium aluminate cement, and 20% PCS, wherein the ratio of PCS to gypsum is 1:2, optionally with aggregates and/or admixtures. For example, a composition may comprise 70% ordinary Portland cement, 10% calcium aluminate cement, 10% gypsum, and 10% PCS, wherein the ratio of PCS to gypsum is 1:1, optionally with aggregates and/or admixtures. Greater or lesser ratios of PCS to gypsum may also be used in the foregoing exemplary compositions. In some embodiments for example, the ratio of PCS to gypsum may be 1:50, 1:45, 1:40, 1:35, 1:30, 1:25, 1:20, 1:15, 1:10, 1:9, 1:8, 1:7, 1:6, 1:5, 1:4, 1:3, 1:2, or 1:1. In some embodiments for example, the ratio of PCS to gypsum may be 50:1, 45:1, 40:1, 35:1, 30:1, 25:1, 20:1, 5:1, 10:1, 9:1, 8:1, 7:1, 6:1, 5:1, 4:1, 3:1, 2:1, or 1:1.

Binary mixtures, ternary mixtures, quaternary mixtures, quinary mixtures, etc. may further comprise additional admixtures (e.g., in concrete compositions) including, but not limited to, set accelerators, set retarders, air-entraining agents, defoamers, alkali-reactivity reducers, bonding admixtures, dispersants, coloring admixtures, corrosion inhibitors, damp proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other known admixture or additives. Calcium aluminates may also be used as an admixture or additive, or to a more significant extent (e.g., up to and including ranges provided above with respect to binary mixtures, ternary mixtures, quaternary mixtures, etc). Calcium aluminates are obtained by heating calcium oxide and aluminium oxide together at high temperatures, and may include, but are not limited to tricalcium aluminate; dodecacalcium hepta-aluminate; monocalcium aluminate; monocalcium dialuminate; monocalcium hexa-aluminate; dicalcium aluminate; pentacalcium trialuminate; and tetracalcium trialuminate. When using any such admixture or additives, the fresh cementitious composition, to which the foregoing admixture or additives are introduced, may be mixed for sufficient time to cause the admixture or additives to be dispersed relatively uniformly throughout the fresh concrete.

Set (e.g., set or cured concrete) and settable compositions (e.g., fresh concrete) may be prepared using the binary, ternary, quaternary, etc. mixtures described herein in accordance with known methods for producing set and settable compositions. Furthermore, in place of, or in addition to OPC, the following hydraulic cement compositions may be used: Portland cement blends such as Portland blast furnace cement; Portland fly ash cement; Portland pozzolan cement; Portland silica fume cement; masonry cements comprising limestone, hydrated lime, air entrainers, retarders, water proofers, and coloring agents; plastic cements, stucco cements; expansive cements; white blended cements; colored cements; very finely ground cements; and non-Portland cements such as pozzolan-lime cements; slag-lime cements; supersulfated cements; calcium sulfoaluminate cements; natural cements; and geopolymer cements.

B. Methods

Provided herein is a method for forming a cementitious or concrete composition, by combining the composition comprising carbonate with CAC wherein the composition comprising carbonate comprises a metastable component selected from the group consisting of vaterite, amorphous calcium carbonate, and combination thereof, and forming the cementitious or concrete composition. Some examples of the methods to prepare the composition comprising carbonate and the cementitious composition are described herein. The CAC may be obtained commercially.

In one aspect, there is provide a method for forming a cementitious or concrete composition, by a) making a composition comprising carbonate by contacting an industrial waste gas stream comprising carbon dioxide with a proton removing agent or an alkali to form a carbon dioxide charged water; b) contacting the carbon dioxide charged water with divalent cations to form the composition comprising carbonate wherein the carbonate comprises a metastable component selected from the group consisting of vaterite, amorphous calcium carbonate, and combination thereof; and c) combining the composition comprising carbonate with CAC, to form a cementitious or concrete composition.

In some embodiments, the above method further includes contacting the carbon dioxide charged water with the divalent cations under precipitation conditions that favor the formation of the composition comprising carbonate wherein the carbonate comprises a metastable component selected from the group consisting of vaterite, amorphous calcium carbonate, and combination thereof. In some embodiments, the precipitation conditions favor the formation of more than 50 wt % vaterite or between 50-99 wt % vaterite in the composition comprising carbonate. Some examples of such precipitation conditions have been described herein.

Figure 1:
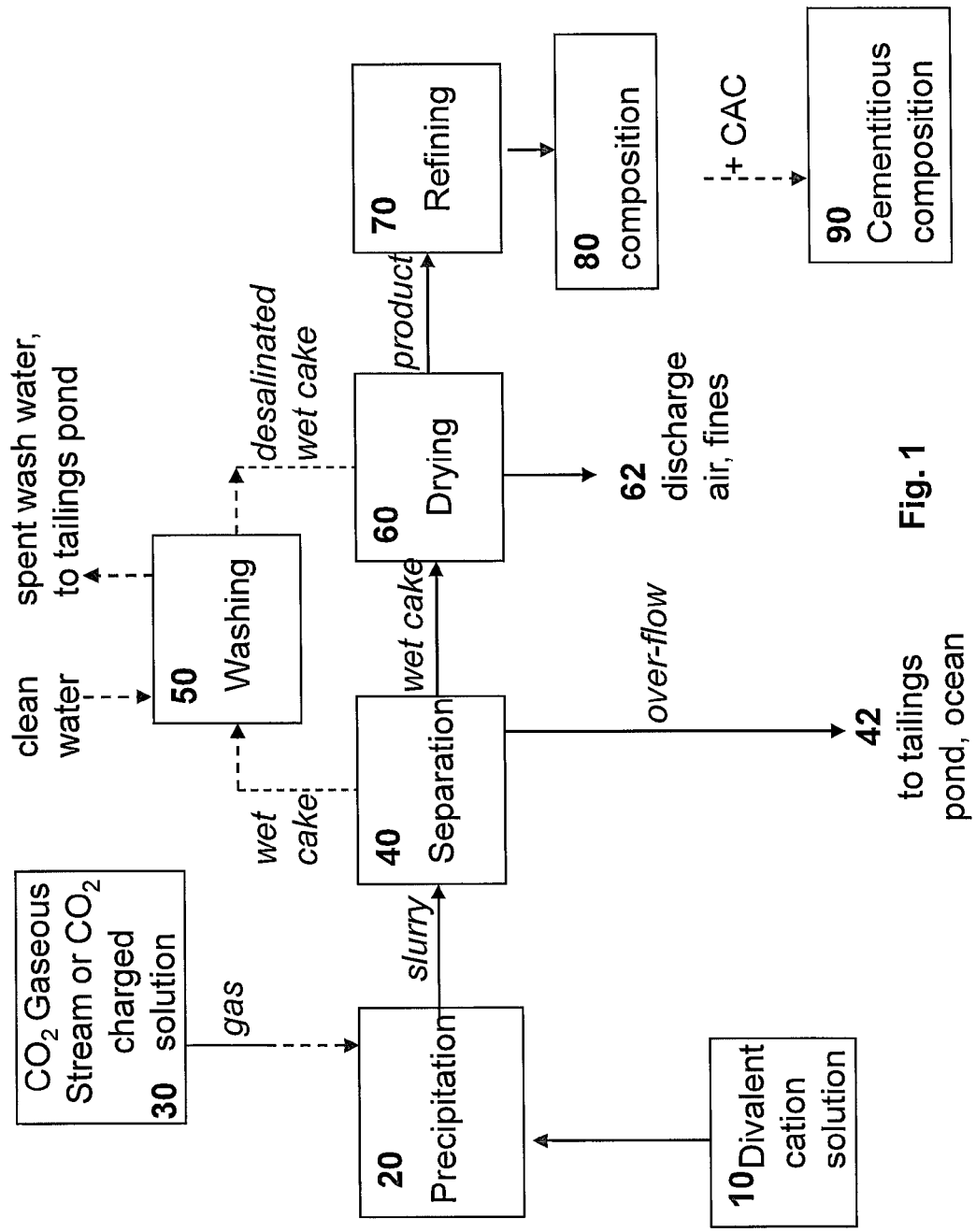
FIG. 1 illustrates a flow diagram for some embodiments provided herein.

An illustration of the process to make the composition comprising carbonate is depicted in FIG. 1. In some embodiments, an absorbing solution, e.g., an alkaline solution is charged with $CO_2$ to produce $CO_2$ charged solution 30, which $CO_2$ charged solution is then subjected to carbonate compound precipitation conditions at step 20. In some embodiments, the divalent cation solution 10 is contacted with the $CO_2$ charged solution containing bicarbonate/carbonate ions, which solution is then subjected to carbonate compound precipitation conditions to form the carbonate composition. The divalent cation solution may contain calcium (such as in hydrated lime or carbide lime or gypsum or any solution containing calcium ions) optionally containing magnesium to precipitate calcium carbonate optionally containing magnesium carbonate. As illustrated in FIG. 1, a $CO_2$ gaseous stream 30 may also be contacted with the divalent cation solution at precipitation step 20. The "$CO_2$ charged water" or "$CO_2$ charged solution" includes water that has had $CO_2$ gas contacted with it to produce, e.g., carbonic acid, bicarbonate and/or carbonate ion.

Below are provided various components that may be used in making the compositions comprising carbonate.

Carbon Dioxide

The source of $CO_2$ that is used in the embodiments provided herein may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in some embodiments, a waste stream or product from an industrial plant. The nature of the industrial plant may vary in these embodiments, where industrial plants of interest include power plants, chemical processing plants, steel mills, paper mills, cement plants, and other industrial plants that produce $CO_2$ as a byproduct. The industrial waste gas stream includes a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the methods include both reducing, e.g., syngas, shifted syngas, natural gas, and hydrogen and the like, and oxidizing condition streams, e.g., flue gases from combustion. Particular multi-component gaseous streams of interest that may be treated according to the invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams for the invention include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Contact protocols for absorbing $CO_2$, include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

Carbon dioxide may be the primary non-air derived component in waste gas streams. In some embodiments, waste gas streams may comprise carbon dioxide in amounts ranging from 200 ppm to 1,000,000 ppm, such as 200,000 ppm to 1000 ppm and including 200,000 ppm to 2000 ppm, for example 130,000 ppm to 2000 ppm, wherein the amounts of carbon dioxide may be considered time-averaged amounts. For example, in some embodiments, waste gas streams may comprise carbon dioxide in an amount ranging from 40,000 ppm (4%) to 100,000 ppm (10%) depending on the waste gas stream (e.g., $CO_2$ from natural gas-fired power plants, furnaces, small boilers, etc.). For example, in some embodiments, waste gas streams may comprise carbon dioxide in an amount ranging from 100,000 ppm (10%) to 150,000 ppm (15%) depending on the waste gas stream (e.g., $CO_2$ from coal-fired power plants, oil generators, diesel generators, etc.). For example, in some embodiments, waste gas streams may comprise carbon dioxide in an amount ranging from 200,000 ppm (20%) to 400,000 ppm (40%) depending on the waste gas stream (e.g., $CO_2$ from cement plant calcination, chemical plants, etc.). For example, in some embodiments, waste gas streams may comprise carbon dioxide in an amount ranging from 900,000 ppm (90%) to 1,000,000 ppm (100%) depending on the waste gas stream (e.g., $CO_2$ from ethanol fermenters, $CO_2$ from steam reforming at refineries, ammonia plants, substitute natural gas (SNG) plants, $CO_2$ separated from sour gases, etc.). The concentration of $CO_2$ in a waste gas stream may be decreased by 10% or more, 20% or more, 30% or more, 40% or more, 50% or more, 60% or more, 70% or more, 80% or more, 90% or more, 95% or more, 99% or more, 99.9% or more, or 99.99%. In other words, at least 10%, 20%, 30%, 40%, 50%, 60%, 70%, 80%, 90%, 95%, 99%, 99.9%, or 99.99% of the carbon dioxide may be removed from the waste gas stream.

A portion of the waste gas stream (i.e., not the entire gaseous waste stream) from an industrial plant may be used to produce compositions comprising carbonates, bicarbonates, or carbonates and bicarbonates. In these embodiments, the portion of the waste gas stream that is employed in producing compositions may be 75% or less, such as 60% or less, and including 50% and less of the waste gas stream. In yet other embodiments, most (e.g., 80% or more) of the entire waste gas stream produced by the industrial plant is employed in producing compositions. In these embodiments, 80% or more, such as 90% or more, including 95% or more, up to 100% of the waste gas stream (e.g., flue gas) generated by the source may be employed for producing compositions of the invention.

Although a waste gas stream from an industrial plant offers a relatively concentrated source of $CO_2$ and/or additional components resulting from combustion of fossil fuels, methods and systems provided herein are also applicable to removing combustion gas components from less concentrated sources (e.g., atmospheric air), which may contain a lower concentration of pollutants than, for example, flue gas. Thus, in some embodiments, methods and systems encompass decreasing the concentration of $CO_2$ and/or additional components in atmospheric air by producing compositions of the invention. As with waste gas streams, the concentration of $CO_2$ in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in $CO_2$ may be accomplished with yields as described herein, or with higher or lower yields, and may be accomplished in one processing step or in a series of processing steps.

Waste gas streams suitable for the invention may further comprise one or more additional components including water; sulfur oxides (SOx); nitrogen oxides (NOx); carbon monoxide (CO); metals such as antimony (Sb), arsenic (As), barium (Ba), beryllium (Be), boron (B), cadmium (Cd), chromium (Cr), cobalt (Co), copper (Cu), lead (Pb), manganese (Mn), mercury (Hg), molybdenum (Mo), nickel (Ni), radium (Ra), selenium (Se), silver (Ag), strontium (Sr), thallium (Tl), vanadium (V), and zinc (Zn), wherein the metals may be in any available form including, but not limited to, an elemental form (e.g., Hg), a salt (e.g., $HgCl_2$), an inorganic compound (e.g., HgO), an organic compound (e.g., an organomercury compound), or particulate form (e.g., Hg(p)); particulate matter (suspended particles of solids or liquids) such as fly ash, dust (e.g., from calcining), and metals; halides such as hydrogen chloride and hydrogen fluoride, which may also be considered acid gases along with, for example, SOx (e.g., $SO_3$, $SO_2$); organics such as volatile organic compounds (VOCs), hydrocarbons, dioxins, and polyaromatic hydrocarbons (PAHs); toxic substances such as hydrogen cyanide and sulfur nitrate ($SNO_3$); and radioactive isotopes such as uranium (U) and thorium (Th), any one or more (e.g., two or more, three or more, four or more, five or more, etc.) of which may be sequestered in a composition of the invention.

In some embodiments, there is provided at least 1%, 5%, 10%, 25%, 30%, 40%, 50%, 60%, 70%, 75%, 80%, 85%, 90%, 95%, 96%, 97%, 98%, 99%, 99.9%, or 99.99% removal of one or more of the additional waste gas stream components, wherein each of the one or more components may be removed at the same or a different percentage level. For example, in some embodiments, 98% of the SOx and 95% of the mercury may be removed from a waste gas stream using systems and methods provided herein, while in other embodiments, 98% of the SOx and 98% of the mercury may be removed from the waste gas stream. In another exemplary embodiment, at least 99% $SO_2$, at least 88% $SO_3$, and 81% HCl, each of which may be considered an acid gas, may be removed from a waste gas stream using systems and methods provided herein. In such an embodiment, there is provided at least 80% removal of acid gases (e.g., SOx, HCl, etc.). In addition to the foregoing, at least 10%, 20%, 30%, 40%, 50%, 60%, 70%, 80%, 90%, 95%, 96%, 97%, 98%, 99%, 99.9%, or 99.99% of the carbon dioxide may be removed from the waste gas stream.

In a typical untreated flue gas resulting from combustion of a low-sulfur eastern bituminous coal, the flue gas may comprise $H_2O$ (5-7%); $O_2$ (3-4%); $CO_2$ (15-16%); Hg (1 ppb); CO (20 ppm); hydrocarbons (10 ppm); HCl (100 ppm); SOx (810 ppm, wherein the concentration of $SO_2$ is 800 ppm and the concentration of $SO_3$ is 10 ppm); NOx (500 ppm, wherein the concentration of NO is 475 ppm and the concentration of $NO_2$ is 25 ppm), and $N_2$ (balance). Different coals may give untreated flue gases with different contaminant concentrations (e.g., 10-15% $CO_2$, 10-20 ppm CO, 500-3000 ppm SOx, 150-500 ppm NOx, 1-2 ppb Hg, 5-10% fly ash, etc.), any of which flue gases are suitable for use herein. In reference to the medium (e.g., aqueous solution) in which $CO_2$ is processed, many of the additional components of waste gas streams may be conveniently, though not strictly, grouped as soluble (e.g., $HgCl_2$, $NO_2$, etc.), reactive (e.g., HCl, HF, etc.), or not soluble and not reactive (e.g., As, Cd, Pb, Cr, V, Se, etc.). Methods provided herein include treating waste gas streams such that certain additional components may be more soluble or more reactive in the medium in which $CO_2$ is processed. For example, in some embodiments, elemental mercury may be oxidized to mercuric chloride ($HgCl_2$) in the presence of hydrogen chloride (HCl) or chlorine ($Cl_2$), which may be generated by electrochemical methods of the invention.

A variety of different methods may be employed to prepare the compositions of the invention. $CO_2$ sequestration protocols of interest include, but are not limited to, those disclosed in U.S. patent application Ser. Nos. 12/126,776, filed 23 May 2008; 12/163,205, filed 27 Jun. 2008; 12/486,692, filed 17 Jun. 2009; 12/501,217, filed 10 Jul. 2009; and 12/557,492, filed 10 Sep. 2009; as well as International Application No. PCT/US08/88318, filed 24 Dec. 2008; and PCT/US09/45722, filed 29 May 2009; the disclosures of which are herein incorporated by reference in their entireties.

In some embodiments, the absorbing solution charged with the partially or fully dissolved $CO_2$ is made by parging or diffusing the $CO_2$ gaseous stream through a solution to make a $CO_2$ charged water. In some embodiments, the solution with $CO_2$ includes an alkaline agent or a proton removing agent or a pH raising agent. In some embodiments, the $CO_2$ gas is bubbled or parged through a solution containing alkali, such as sodium or potassium hydroxide or sodium or potassium carbonate, in an absorber. In some embodiments, the absorber may include a bubble chamber where the $CO_2$ gas is bubbled through the solution containing the alkali. In some embodiments, the absorber may include a spray tower where the solution containing the alkali is sprayed or circulated through the $CO_2$ gas. In some embodiments, the absorber may include a pack bed to increase the surface area of contact between the $CO_2$ gas and the solution containing the alkali. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety. The $CO_2$ charged water may be then contacted with the divalent cation i.e. alkaline earth metal containing water to form the carbonate composition.

Absorbing Solution or Alkaline Solution

In some embodiments, the absorbing solution that comes into contact with the $CO_2$ source is an alkaline solution. An "alkaline solution" or "alkali" or "proton removing agent" or "pH raising agent", as used herein, includes solutions of pH greater than 8, e.g. 8-14, such as, but not limited to, NaOH, $Na_2CO_3$, KOH, $K_2CO_3$, $NH_4OH$, $Ca(OH)_2$, $Mg(OH)_2$, or combinations thereof.

Provided is a method for contacting an alkaline solution with a source of carbon dioxide to produce a composition comprising carbonates, bicarbonates, or carbonates and bicarbonates, wherein the composition is a solution or slurry. Contacting the alkaline solution with the source of carbon dioxide facilitates dissolution of $CO_2$ into the alkaline solution producing carbonic acid (e.g., hydrated $CO_2$), a species in equilibrium with both bicarbonate and carbonate. In order to produce compositions comprising carbonate (e.g., precipitation material comprising carbonates, bicarbonates, or carbonates and bicarbonates), protons are removed from various species (e.g. carbonic acid, bicarbonate, hydronium, etc.) in the alkaline solution to shift the equilibrium toward bicarbonate, carbonate, or somewhere in between. As protons are removed, more $CO_2$ goes into solution. In some embodiments, proton-removing agents and/or methods are used while contacting an aqueous solution with $CO_2$ to increase $CO_2$ absorption in one phase of the reaction, wherein the pH may remain constant, increase, or even decrease, followed by a rapid removal of protons (e.g., by addition of a base), which, in some embodiments, may cause rapid precipitation of precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of waste streams from industrial processes, and using electrochemical means.

In some embodiments, the hydrated lime or the carbide lime that is being used as a source of divalent cations also acts as a source of proton removing agents due to the presence of $CaO/Ca(OH)_2$. In some embodiments, the absorbing solution is a saltwater solution comprising the alkali. A saltwater, as used herein, includes, but is not limited to, sea water, brackish water, brines, and salt containing solutions, such as, sodium chloride solutions. Other absorbing solutions that may be used in methods of the invention to contact the $CO_2$ from the $CO_2$ source include, but are not limited to, water, municipal water, surface water, amine solutions, non-aqueous solutions, organic solvent solutions, or any combination thereof. Absorbing solution may be used to remove gaseous carbon dioxide from a gaseous source of carbon dioxide in a gaseous carbon dioxide removal process.

Naturally occurring proton-removing agents encompass any proton-removing agents found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are described in U.S. patent application Ser. No. 12/501,217, filed 10 Jul. 2009, which is incorporated herein by reference in its entirety. Some embodiments provide for using naturally occurring bodies of water as a source proton-removing agents, which bodies of water comprise carbonate, borate, sulfate, or nitrate alkalinity, or some combination thereof. Any alkaline brine (e.g., surface brine, subsurface brine, a deep brine, etc.) is suitable for use in the invention. In some embodiments, a surface brine comprising carbonate alkalinity provides a source of proton-removing agents. In some embodiments, a surface brine comprising borate alkalinity provides a source of proton-removing agents. In some embodiments, a subsurface brine comprising carbonate alkalinity provides a source of proton-removing agents. In some embodiments, a subsurface brine comprising borate alkalinity provides a source of proton-removing agents. In some embodiments, a deep brine comprising carbonate alkalinity provides a source of proton-removing agents. In some embodiments, a deep brine comprising borate alkalinity provides a source of proton-removing agents. Examples of naturally alkaline bodies of water include, but are not limited to, surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. For additional sources of brines and evaporites, see U.S. Provisional Patent Application No. 61/264,564, filed 25 Nov. 2009, which is incorporated herein by reference in its entirety.

In some embodiments, organisms that excrete basic molecules or solutions in their normal metabolism are used as proton-removing agents. Examples of such organisms are fungi that produce alkaline protease (e.g., the deep-sea fungus Aspergillus ustus with an optimal pH of 9) and bacteria that create alkaline molecules (e.g., cyanobacteria such as Lyngbya sp. from the Atlin wetland in British Columbia, which increases pH from a byproduct of photosynthesis). In some embodiments, organisms are used to produce proton-removing agents, wherein the organisms (e.g., Bacillus pasteurii, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to enhance dissolution of $CO_2$ and accelerate precipitation of precipitation material, as described in herein.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for preparation of compositions of the invention. In some embodiments, ammonia is used to raise pH to a level sufficient for preparation of compositions of the invention. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to providing cations (e.g., $Ca^{2+}$, $Mg^{2+}$, etc.) and other suitable metal forms suitable for use herein, waste streams from various industrial processes (i.e., industrial waste streams) may provide proton-removing agents. Such waste streams include, but are not limited to, mining wastes; ash (e.g., coal ash such as fly ash, bottom ash, boiler slag);

slag (e.g. iron slag, phosphorous slag); cement kiln waste (e.g., cement kiln dust (CKD)); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Red mud, depending on processing conditions and source material (e.g., bauxite) might comprise $Fe_2O_3$, $Al_2O_3$, $SiO_2$, $Na_2O$, CaO, $TiO_2$, $K_2O$, MgO, $CO_2$, $S_2O$, $MnO_2$, $P_2O_5$, each of which species are loosely listed in order from most abundant to least abundant, and each of which species are expressed as oxides for convenience. Coal ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

The alkali such as NaOH, KOH, $Na_2CO_3$, etc. may be made using any electrochemical method known in the art. Some examples of the electrochemical methods are described herein below.

Electrochemical Methods

Electrochemical methods may be used to produce alkalinity, such as hydroxide species (e.g. NaOH, KOH, $OH^-$) or carbonate species (e.g. $Na_2CO_3$, $K_2CO_3$, $H_2CO_3$, $CO_3^{2-}$). Electrochemical methods may be used to produce alkalinity at a cathode, such as hydroxide species (e.g. NaOH, KOH, $OH^-$) or carbonate species (e.g. $Na_2CO_3$, $K_2CO_3$, $H_2CO_3$, $CO_3^{2-}$). The electrochemical methods of the invention are described in more detail in commonly assigned applications with application Ser. Nos. 12/541,055, filed Aug. 13, 2009; 12/503,557, filed Jul. 15, 2009; and 13/474,598, filed May 17, 2012, and commonly assigned U.S. Pat. Nos. 7,875,163 and 7,790,012, each of which are incorporated by reference herein in their entirety.

Figure 2:
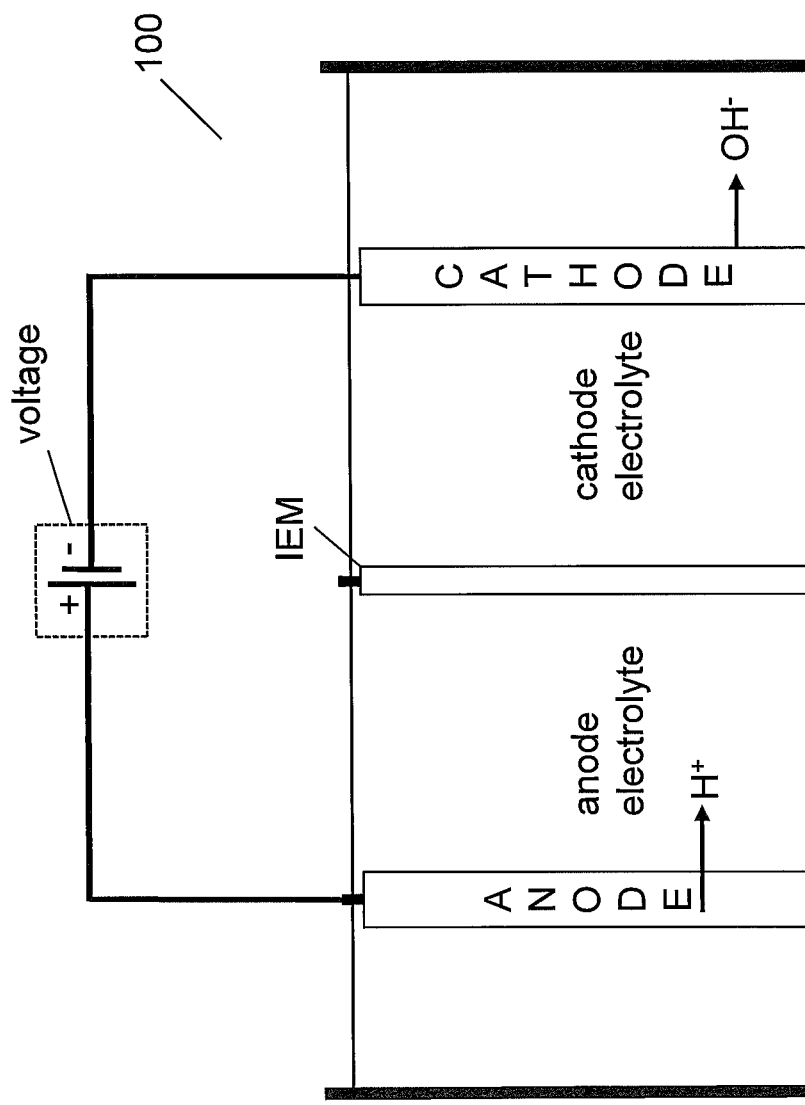
FIG. 2 illustrates an embodiment of the electrochemical system provided herein.
Figure 3:
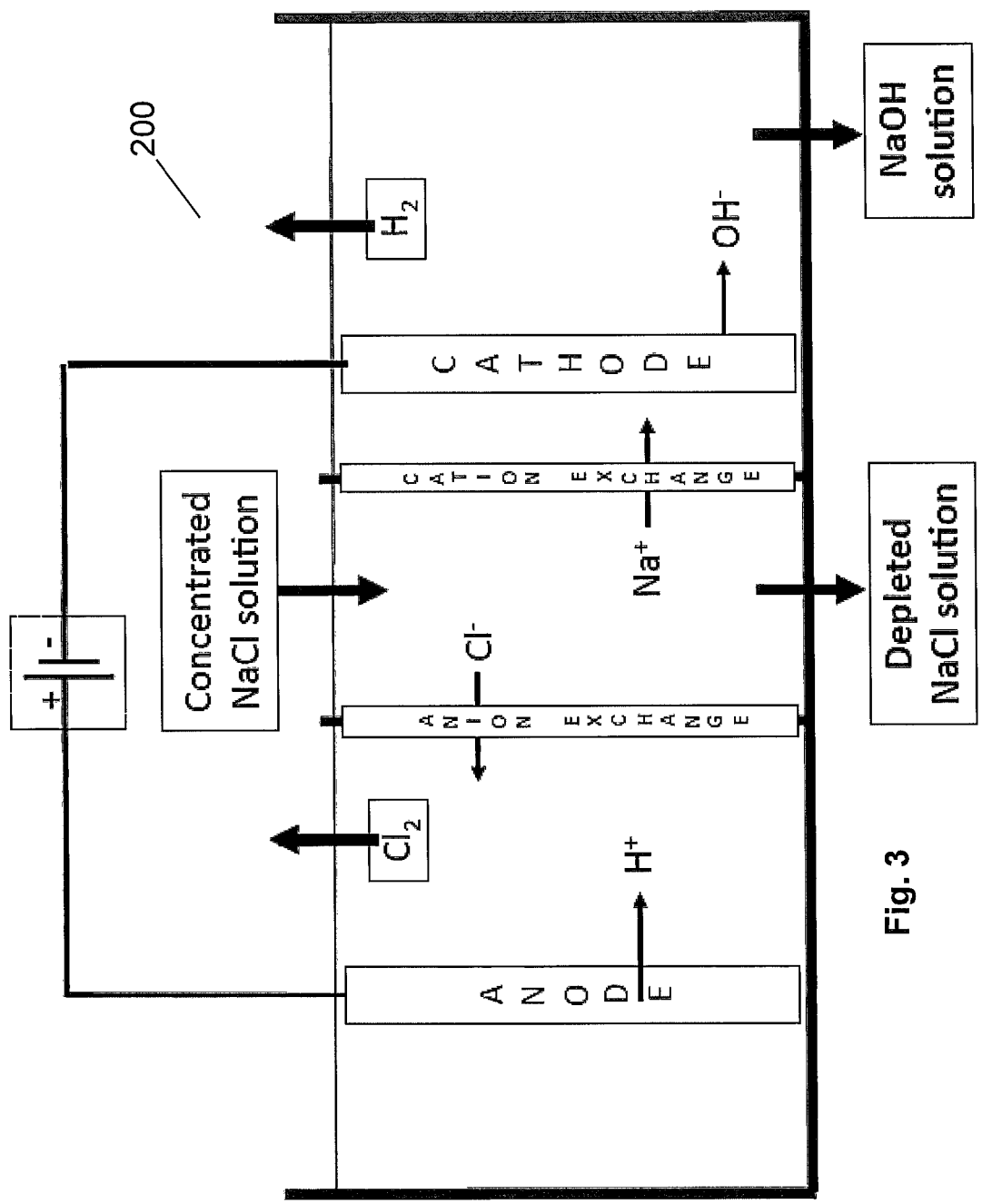
FIG. 3 illustrates an embodiment of the electrochemical system provided herein.

In some embodiments, the electrochemical cell includes at least one unit cell, the unit cell including at least a cathode, an anode, at least one ion exchange membrane, electrolytes, and a potentiostat device for applying a voltage across the anode and cathode of such a unit cell or a collection of units cells that could be in stacked in a larger electrochemical cell. An example of the electrochemical cell is illustrated in FIG. 2 where the electrochemical cell 100 has a cathode chamber containing the cathode and the cathode electrolyte; an anode chamber containing the anode and the anode electrolyte; and an ion exchange membrane between the cathode chamber and the anode chamber. The hydroxide is formed in the cathode electrolyte and depending on the electrolyte used an acid is formed in the anode electrolyte. For example, if sodium chloride is used as the anode electrolyte, then chloride ions may combine with the hydrogen ions formed at the anode to form acid in the anode electrolyte. The sodium ions may pass through the ion exchange membrane to the cathode electrolyte to form sodium hydroxide. It is to be understood that FIG. 2 is for illustration purposes only and deviations from the electrochemical cell are well within the scope of the invention as long as an alkali is formed in the cathode electrolyte. For example, the cell may contain an anion exchange membrane and a cation exchange membrane as illustrated in the electrochemical cell 200 in FIG. 3. As illustrated in FIG. 3, the hydrogen gas is formed at the cathode which is then transferred to the anode to form hydrogen ions.

In some embodiments, a potentiostat device is used to apply a voltage of 2.0V or less across the anode and the cathode of the electrochemical cell, resulting in production of alkalinity at the cathode without production of any gas at the anode. The alkaline solution may be withdrawn from the electrochemical cell to be used in the absorption of carbon dioxide to form the cementitious composition of the invention. In some embodiments, a potentiostat device is used to apply a voltage of 1.9V or less across an anode and a cathode of an electrochemical cell, resulting in production of alkalinity at the cathode without production of any gas at the anode, such as 1.8V or less, such as 1.7V or less, such as 1.6V or less, such as 1.5V or less, such as 1.4V or less, such as 1.3V or less, such as 1.2V or less, such as 1.1V or less, such as 1.0V or less, such as 0.9V or less, such as 0.8V or less, such as 0.7V or less, such as 0.6V or less, such as 0.5V or less resulting in the production of alkalinity at the cathode. In some embodiments, a potentiostat device is used to apply a voltage of 0.5V or less across an anode and a cathode of an electrochemical cell, resulting in production of alkalinity at the cathode without production of any gas at the anode.

In some embodiments, the acid formed in the anode electrolyte may be used for chlorination. In some embodiments, the acid may be used to chlorinate unsaturated hydrocarbons such as, but not limited to, ethylene, styrene etc. to form chlorinated products, such as, but not limited to, styrene chloride, vinyl chloride, etc. The chlorinated products may be then used as monomers (e.g. chlorinated products of olefins, acrylates, monomers of condensation polymers, ethylene, styrene, propylene, methyl methacrylate) to form polymers, such as but not limited to, poly(vinyl chloride) etc. The polymers may then be used as reinforcing materials in the compositions of the invention. In some embodiments, the unsaturated hydrocarbon may be added to the anode electrolyte where the acid formed in the anode electrolyte reacts with the unsaturated hydrocarbon to form chlorinated products. In some embodiments, the unsaturated hydrocarbon is treated with the acid outside the anode chamber to form the chlorinated products.

In some embodiments, the anode oxidizes metals to form metal chlorides in higher oxidation state which may be used to chlorinate the unsaturated or saturated hydrocarbons to form chlorinated hydrocarbons (not shown in figures). The chlorinated hydrocarbons may be used to form vinyl chloride monomer and then PVC. The cathode in such systems forms hydroxides which may be used to form absorbing solution for absorbing carbon dioxide gas to form the cementitious compositions of the invention. Such electrochemical systems and methods are described in more detail in commonly assigned application with application Ser. No. 13/474,598, filed May 17, 2012, which is incorporated by reference herein in its entirety.

In some embodiments, the carbon dioxide may be passed into the cathode electrolyte where the hydroxide dissolves the carbon dioxide to form carbonate/bicarbonate species. This cathode electrolyte containing the carbonate/bicarbonate species may be withdrawn from the cathode chamber and reacted with cations from the cation source to form the compositions of the invention. In some embodiments, the cathode electrolyte may be withdrawn and transferred to a contactor which is also connected to the source of carbon dioxide. The contactor containing the alkaline cathode electrolyte may then absorb the carbon dioxide to form carbonate/bicarbonate species in the solution. The carbonate/bicarbonate species containing solution may be contacted with the cations to form the compositions of the invention or the carbonate/bicarbonate species containing solution is recirculated back to the cathode chamber where the bicarbonate may be converted to the carbonate and the carbonate solution is withdrawn from the cathode chamber. Such electrochemical systems and methods are described in more detail in commonly assigned application with application Ser. No. 12/503,557, filed Jul. 15, 2009, which is incorporated by reference herein in its entirety.

Cation Source

The absorbing alkaline solution after being contacted with carbon dioxide may result in a $CO_2$ charged solution or $CO_2$ charged water containing carbonic acid, bicarbonate, carbonate, or combination thereof. The solution may be then treated with divalent cations from a source of cations to form carbonate/bicarbonates containing products such as but not limited to, calcium carbonate, calcium bicarbonate, magnesium carbonate, magnesium bicarbonate, or combination thereof.

In some embodiments, an order for the addition of the $CO_2$ or the $CO_2$ charged water and the divalent cation containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing the divalent cation containing water for precipitation of the carbonate precipitate in the precipitation step 20 (illustrated in FIG. 1). In some embodiments, the divalent cation containing water is added to the reactor containing the $CO_2$ gaseous stream or the solution containing the partially or fully dissolved $CO_2$ or the affluent from the absorber containing an alkaline solution of $CO_2$ or the $CO_2$ charged water for precipitation of the carbonate precipitate in the precipitation step 20. In some embodiments, the divalent cation containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

The source of cations, such as sodium, potassium, or divalent cation etc., is any aqueous medium containing alkaline earth metals, such as, but are not limited to, calcium, magnesium, strontium, barium, etc. or combination thereof. The "divalent cation" and "alkaline earth metal ion" are used interchangeably herein. In some embodiments, the divalent cation is calcium, magnesium, or combination thereof and the source of divalent cation is any aqueous medium containing calcium, magnesium or combination thereof. In some embodiments, the divalent cation source is also the source of water and/or source of alkalinity, as described herein. For example, the aqueous solution of divalent cations may comprise cations derived from freshwater, brackish water, seawater, or brine (e.g., naturally occurring subterranean brines or anthropogenic subterranean brines such as geothermal plant wastewaters, desalination plant waste waters), as well as other salines having a salinity that is greater than that of freshwater, any of which may be naturally occurring or anthropogenic.

In some embodiments, the divalent cations such as, alkaline earth-metal containing water may be a hydrated lime or carbide lime which is contacted with a solution charged with the partially or fully dissolved $CO_2$, which $CO_2$ solution is then subjected to one or more carbonate compound precipitation conditions. In such embodiments, the hydrated lime or the carbide lime also provides proton removing agents or alkalinity sufficient to precipitate calcium and/or magnesium carbonates. In some embodiments, the alkalinity of the carbide lime may be supplemented with other proton removing agents, such as, hydroxides. Such use of carbide lime in sequestering $CO_2$ to form carbonate compositions is being described in U.S. Provisional Application No. 61/617,243, filed Mar. 29, 2012, titled "Methods and systems for utilizing carbide lime," which is incorporated herein by reference in its entirety.

In some embodiments, the divalent cations such as, alkaline earth-metal containing water may be gypsum solution which may be contacted with a solution charged with the partially or fully dissolved $CO_2$, which $CO_2$ solution is then subjected to one or more carbonate compound precipitation conditions. Such use of gypsum as a source of calcium to form carbonate compositions is being described in U.S. application Ser. No. 13/566,213, filed Aug. 3, 2012, which is incorporated herein by reference in its entirety.

Divalent cations (e.g., alkaline earth metal cations such as $Ca^{2+}$ and $Mg^{2+}$), which are useful for producing composition comprising carbonate, may be found in industrial wastes, seawater, brines, hard water, minerals, and many other suitable sources. In some embodiments, the commercially available divalent cations, such as, but not limited to, calcium chloride dissolved in water, may be used as the divalent cation solution for the precipitation of the composition.

In some locations, industrial waste streams from various industrial processes provide for convenient sources of cations (as well as in some cases other materials useful in the process, e.g., metal hydroxide). Such waste streams include, but are not limited to, mining wastes; fossil fuel burning ash (e.g., fly ash, bottom ash, boiler slag); slag (e.g., iron slag, phosphorous slag); cement kiln waste (e.g., cement kiln dust); oil refinery/petrochemical refinery waste (e.g., oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge. In some embodiments, an aqueous solution of divalent cations may be obtained from an industrial plant that is also providing a waste gas stream (e.g., combustion gas stream). For example, in water-cooled industrial plants, such as seawater-cooled industrial plants, water that has been used by an industrial plant for cooling may then be used as water for producing precipitation material. If desired, the water may be cooled prior to entering a precipitation system of the invention. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

In some locations, a convenient source of cations for use in systems and methods of the invention is water (e.g., an aqueous solution including cations such as seawater or subterranean brine), which may vary depending upon the particular location at which the invention is practiced. Suitable aqueous solutions of cations that may be used include solutions including one or more divalent cations, e.g., alkaline earth metal cations such as $Ca^{2+}$ and $Mg^{2+}$. In some embodiments, the aqueous source of cations comprises alkaline earth metal cations. In some embodiments, the alkaline earth metal cations include calcium, magnesium, or a mixture thereof. In some embodiments, the aqueous solution of cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm, or 10,000 to 50,000 ppm, or 20,000 to 50,000 ppm, or 20,000 to 30,000 ppm.

In some embodiments, mineral rich freshwater may be a convenient source of cations (e.g., cations of alkaline earth metals such as $Ca^{2+}$ and $Mg^{2+}$). Any number of suitable freshwater sources may be used, including freshwater sources ranging from sources relatively free of minerals to sources relatively rich in minerals. Mineral-rich freshwater sources may be naturally occurring, including any number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of cations such as alkaline earth metal cations (e.g., $Ca^{2+}$, $Mg^{2+}$, etc.) to produce a mineral-rich water that is suitable for methods and systems described herein. Cations or precursors thereof (e.g., salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, freshwater including $Ca^{2+}$ is combined with magnesium silicates (e.g., olivine or serpentine), or products or processed forms thereof, yielding a solution including calcium and magnesium cations.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other aqueous solutions having a salinity that is greater than that of freshwater, any of which may be naturally occurring or anthropogenic. Freshwater may be considered to have a salinity of less than 0.5 ppt (parts per thousand). Brackish water may comprise more salt than freshwater, but not as much as salt as seawater. Brackish water may be considered to have a salinity ranging from about 0.5 to about 35 ppt. Seawater may be water from a sea, an ocean, or any other body of water that has a salinity ranging from about 35 to about 50 ppt. Brine may have a salinity that is about 50 ppt or greater. As such, brine may be water saturated or nearly saturated with salt. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cations are derived is a surface brine. In some embodiments, the water source from which divalent cations are derived is a subsurface brine. In some embodiments, the water source from which divalent cations are derived is a deep brine. In some embodiments, the water source from which divalent cations are derived is a Ca—Mg—Na—(K)—Cl; Na—(Ca)—$SO_4$—Cl; Mg—Na—(Ca)—$SO_4$—Cl; Na—$CO_3$—Cl; or Na—$CO_3$—$SO_4$—Cl brine. In some embodiments, the water source from which divalent cation are derived is an anthropogenic brine selected from a geothermal plant wastewater or a desalination wastewater.

Many minerals provide sources of cations and, in addition, some minerals are sources of base. Divalent cation-containing minerals include mafic and ultramafic minerals such as olivine, serpentine, and other suitable minerals, which may be dissolved using any convenient protocol. In one embodiment, cations such as calcium may be provided for methods and compositions of this invention from feldspars such as anorthite. Cations may be obtained directly from mineral sources or from subterranean brines, high in calcium or other divalent cations. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base.

Metal silicates (e.g., magnesium silicates) and other minerals including cations of interest may be dissolved, for example, in acid such as HCl (optionally from an electrochemical process) to produce, for example, magnesium and other metal cations for use in compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% (w/w).

Precipitation Conditions

In some embodiments, the methods described herein include contacting the carbon dioxide charged water with the divalent cations under precipitation conditions that favor the formation of the composition comprising carbonate comprising a metastable component selected from the group consisting of vaterite, amorphous calcium carbonate, and combination thereof. In some embodiments, the precipitation conditions favor the formation of more than 50 wt % vaterite or between 50-99 wt % vaterite in the cementitious composition. Accordingly, there are provided methods for forming a cementitious or concrete composition, by a) making a composition comprising carbonate by contacting an industrial waste gas stream comprising carbon dioxide with a proton removing agent to form a carbon dioxide charged water; b) contacting the carbon dioxide charged water with divalent cations under one or more precipitation conditions that favor the formation of the composition comprising carbonate comprising a metastable component selected from the group consisting of vaterite, amorphous calcium carbonate, and combination thereof; and c) combining the composition comprising carbonate with CAC, to form a cementitious or concrete composition.

In some embodiments, the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combinations thereof. Accordingly, there are provided methods for forming a cementitious or concrete composition, by a) making a composition comprising carbonate by contacting an industrial waste gas stream comprising carbon dioxide with a proton removing agent to form a carbon dioxide charged water; b) contacting the carbon dioxide charged water with divalent cations under one or more precipitation conditions that favor the formation of the composition comprising carbonate comprising a metastable component selected from the group consisting of vaterite, amorphous calcium carbonate, and combination thereof wherein the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combination thereof; and c) combining the composition comprising carbonate with CAC, to form a cementitious or concrete composition. In some of the foregoing embodiments, the precipitation conditions favor the formation of more than 50 wt % vaterite or between 50-99 wt % vaterite in the cementitious composition.

Some of the precipitation conditions are described in commonly assigned U.S. Pat. Nos. 7,735,274, and 8,062,418, both of which are incorporated herein by reference in their entirety.

At precipitation step 20 (FIG. 1), carbonate compounds, which may be amorphous or crystalline, are precipitated. Precipitation conditions include those that change the physical environment of the water to produce the desired precipitate product. In some embodiments, the precipitation conditions include temperature of the aqueous solution, including adjustment the solution temperature to between 0° C. and 100° C., such as between 5° C. and 90° C., such as between 10° and 80° C., such as between 20° C. and 60° C., such as between 20° C. and 50° C.

The residence time of the precipitate in the reactor before the precipitate is removed from the solution, may vary. In some embodiments, the residence time of the precipitate in the solution is more than 5 seconds, or between 5 seconds-1 hour, or between 5 seconds-1 minute, or between 5 seconds to 20 seconds, or between 5 seconds to 30 seconds, or between 5 seconds to 40 seconds. Without being limited by any theory, it is contemplated that the residence time of the precipitate may affect the size of the particle. For example, a shorter residence time may give smaller size particles or more disperse particles whereas longer residence time may give agglomerated or larger size particles. In some embodiments, the residence time in the process of the invention may be used to make small size as well as large size particles in a single or multiple batches which may be separated or may remain mixed for later steps of the process. In some embodiments, the finely disperse particles may be processed further to give the composition of the invention. In some embodiments, the large or agglomerated particles may be processed to give the composition comprising carbonate.

While the pH of the water may range from 7 to 14 during a given precipitation process, in certain embodiments the pH is raised to alkaline levels in order to drive the precipitation of carbonate compound as desired. In some embodiments, the pH is raised to a level which minimizes if not eliminates $CO_2$ gas generation during precipitation. In these embodiments, the pH may be raised to 10 or higher, such as 11 or higher. In some embodiments, the one or more conditions or the precipitation conditions include contacting the saltwater or the divalent cation containing water with a proton removing agent. The proton removing agent may be any proton removing agent, as described herein, for example, but not limited to, oxide, hydroxide, such as sodium hydroxide, carbonate, coal ash, naturally occurring mineral, and combination thereof. In some embodiments, the one or more conditions or the precipitation conditions include contacting the saltwater or the divalent cation containing water to electrochemical conditions. Such electrochemical conditions have been described herein.

The nature of the precipitate may be affected by the pH of the precipitation process. In some embodiments, high pH may lead to rapid precipitation and agglomeration of the particles whereas lower pH or slow raise in the pH may lead to finer particles. Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, an unstable or metastable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like.

The nature of the precipitate (such as the formation of vaterite) can also be influenced by selection of appropriate major ion ratios. Major ion ratios also have influence of polymorph formation. For example, as the magnesium:calcium ratio in the water increases, aragonite may become the favored polymorph of calcium carbonate over low-magnesium calcite. At low magnesium:calcium ratios, low-magnesium calcite is the preferred polymorph. As such, a wide range of magnesium:calcium ratios can be employed, including, e.g., 100/1, 50/1, 20/1, 10/1, 5/1, 2/1, 1/1, 1/2, 1/5, 1/10, 1/20, 1/50, 1/100. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation may also have an effect on compound phase formation. The most rapid precipitation can be achieved by seeding the solution with a desired phase. Without seeding, rapid precipitation can be achieved by rapidly increasing the pH of the water, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

$CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

In certain embodiments, the methods further include contacting the volume of water that is subjected to the mineral precipitation conditions with $CO_2$. Contact of the water with the $CO_2$ may occur before and/or during the time when the water is subjected to $CO_2$ precipitation conditions. Accordingly, embodiments of the invention include methods in which the volume of water is contacted with $CO_2$ prior to subjecting the volume of salt water to mineral precipitation conditions. Embodiments of the invention include methods in which the volume of salt water is contacted with the $CO_2$ while the volume of salt water is being subjected to carbonate compound precipitation conditions. Embodiments of the invention include methods in which the volume of water is contacted with the $CO_2$ both prior to subjecting the volume of salt water to carbonate compound precipitation conditions and while the volume of salt water is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other divalent cations may be added, that can have more carbon dioxide cycled through it, precipitating more carbonate compounds.

The above described processes result in the production of a slurry of a carbonate containing precipitate and a mother liquor. Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

Following production of the carbonate precipitate from the water, the resultant precipitated carbonate compound composition is separated from the mother liquor to produce separated carbonate compound precipitate product, as illustrated at step 40 of FIG. 1. The slurry components are separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ is carried out in a manner sufficient to reduce the pH to a range between 5 and 9, e.g., 6 and 8.5, including 7.5 to 8.2. In certain embodiments, the treated brine may be contacted with the $CO_2$, e.g., as described above, to sequester further $CO_2$. For example, where the mother liquor is to be returned to the ocean, the mother liquor may be contacted with the $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal 42. In certain embodiments, it may be disposed of in a naturally occurring body of water, e.g., ocean, sea, lake or river. In certain embodiments, the mother liquor is returned to the source of feedwater for the methods of invention, e.g., an ocean or sea. Alternatively, the mother liquor may be further processed, e.g., subjected to desalination protocols, as described further in U.S. application Ser. No. 12/163,205, filed Jun. 27, 2008; the disclosure of which is herein incorporated by reference.

In certain embodiments, following production of the carbonate precipitate, the resultant product is separated from the mother liquor to produce separated carbonate composition. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitate.

The resultant dewatered precipitate (may be used directly as the composition comprising carbonate) is then dried to produce the composition comprising carbonate, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc.

At step 70, the dried precipitate (may be used directly as the composition comprising carbonate) may be refined, e.g., to provide for desired physical characteristics, such as particle size, surface area, etc., or to add one or more components to the precipitate, to produce the composition comprising carbonate 80. In certain embodiments, the precipitate product is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

In some embodiments, the particles with different morphologies, such as fine or agglomerated, and/or the particles with different sizes (blends) may be mixed to make the composition comprising carbonate. For example, the composition comprising carbonate may include a mix of fine disperse particles with larger agglomerated particles or the composition comprising carbonate may include a mix of particles with different sizes, e.g., particles with sizes ranging between 0.1 micron to 100 micron. In some embodiments, the composition comprising carbonate may be modulated by mixing the particles with different particle size, surface area, zeta potential, and/or morphologies.

The vaterite containing carbonate composition may be optionally activated by refining, milling, aging, and/or curing, e.g., to provide for desired physical characteristics, such as activation, particle size, surface area, zeta potential, etc. The vaterite containing carbonate composition may also be activated by adding an aragonite seed, inorganic additive or organic additive. Further, one or more components may be added to the composition, such as the CAC, CAC and aggregate, or sand, or rocks etc., to produce the cementitious composition of the invention 90.

Carboaluminate Formation

The cementitious compositions of the invention comprising the composition comprising carbonate and the CAC may be contacted with water when the cementitious compositions sets and hardens to form cement. In some embodiments, the cementitious composition of the invention after mixing in the water is poured into the molds designed to make one or more of the pre-formed building material. The composition is then allowed to set and harden into the pre-formed or pre-cast material.

The amorphous calcium carbonate (ACC) and/or vaterite present in the composition comprising carbonate when comes into contact with water, may precipitate and transform into one or more of its stable phases (aragonite and/or calcite). Accordingly, in some embodiments, after contacting the cementitious or the concrete composition with water, the vaterite converts to aragonite and the composition sets and hardens into cement. In some embodiments, such conversion of the vaterite to aragonite may take place when the composition is a self-cement composition. In some embodiments, after contacting the cementitious or concrete composition with water, the vaterite may interact with the aluminates of CAC to form more stable monocarboaluminate, hemicarboaluminate, or combination thereof. The composition then sets and hardens into cement with enhanced properties, as described herein. In some embodiments, the vaterite may not convert to aragonite but interact with the aluminates of CAC to form more stable monocarboaluminate, hemicarboaluminate, or combination thereof, e.g., when the composition is a PCS composition. In some embodiments, the vaterite may convert to aragonite as well as interact with the aluminates of CAC to form more stable monocarboaluminate, hemicarboaluminate, or combination thereof.

Figure 4:
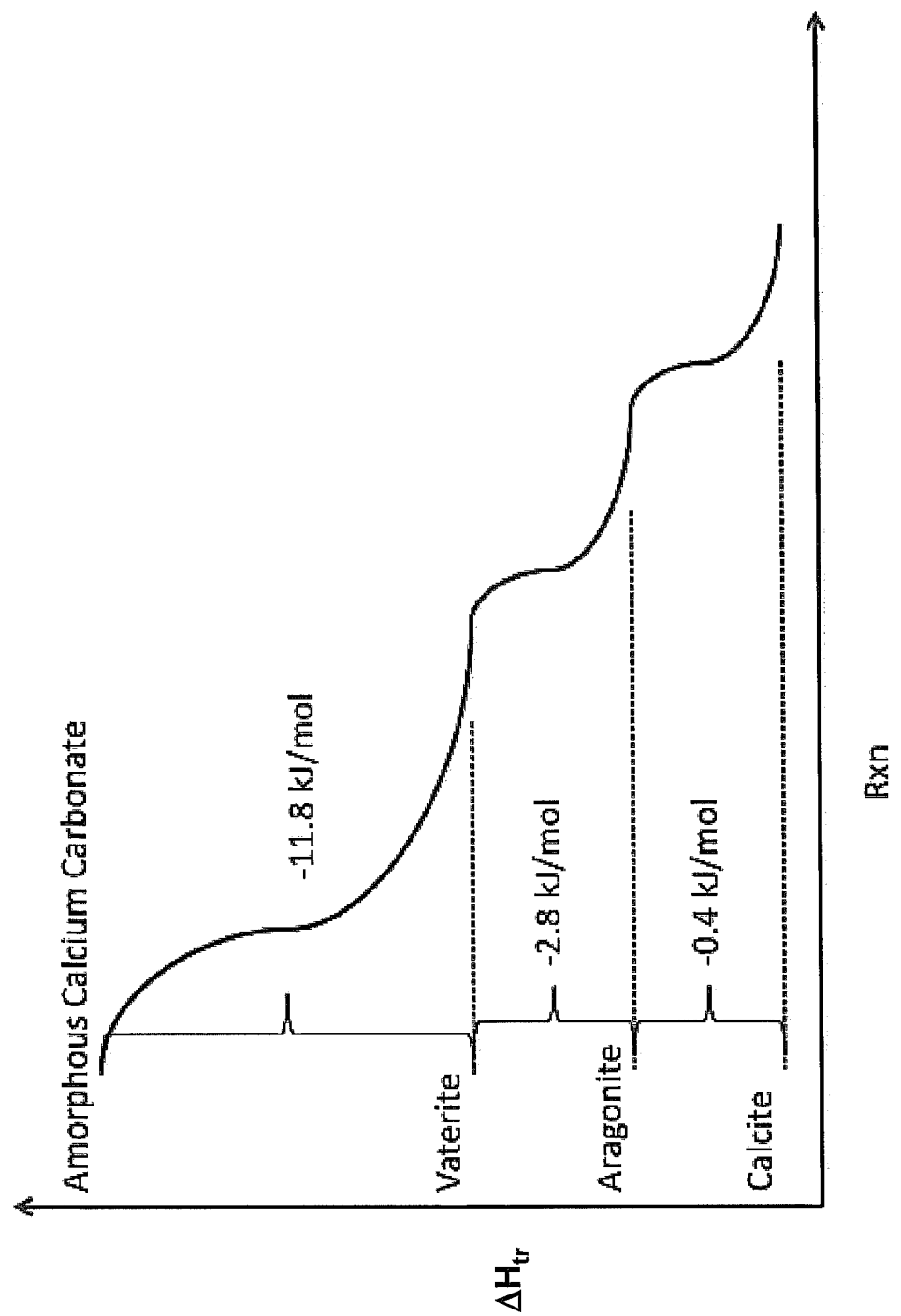
FIG. 4 illustrates a Gibbs free energy diagram of the transition from vaterite to aragonite.

A thermodynamic driving force may exist for the transformation from unstable phases, such as vaterite, to more stable phases, such as aragonite or calcite (for self-cement composition) as described by Ostwald in his Step Rule (Ostwald, W. *Zeitschrift fur Physikalische Chemie* 289 (1897)). Calcium carbonate phases may transform in the order: ACC to vaterite, aragonite, and calcite where intermediate phases may or may not be present. For instance, ACC can transform to vaterite and may not transform to aragonite or calcite; or ACC can transform to vaterite and then directly to calcite, skipping the aragonite form; or alternatively, ACC can transform to vaterite and then to aragonite without transforming to calcite. In some embodiments, the vaterite containing compositions transform to aragonite after dissolution and reprecipitation. During this transformation, excesses of energy are released, as exhibited by FIG. 4. This intrinsic energy may be harnessed to create a strong aggregation tendency and surface interactions that may lead to agglomeration and cementing. It is to be understood that the values reported in FIG. 4 are well known in the art and may vary.

The transformation between calcium carbonate polymorphs may occur via solid-state transition or may be solution mediated. In some embodiments, the transformation is solution-mediated because it may require less energy than the thermally activated solid-state transition. The solution-mediated transformation is environmentally conscious and more applicable to a cementing application. Vaterite is metastable and the difference in thermodynamic stability of calcium carbonate polymorphs may be manifested as a difference in solubility, where the least stable phases are the most soluble (Ostwald, supra.). Therefore, vaterite may dissolve readily in solution and transform favorably towards a more stable polymorph: aragonite. The driving force for the formation of a particular calcium carbonate polymorph or combination of polymorphs is the change in Gibbs free energy from a supersaturated solution to equilibrium (Spanos & Koutsoukos *Journal of Crystal Growth* (1998) 191, 783-790).

In a polymorphic system like calcium carbonate, two kinetic processes may exist simultaneously in solution: dissolution of the metastable phase and growth of the stable phase (Kralj et al. *Journal of Crystal Growth* (1997) 177, 248-257). In some embodiments, the aragonite or calcite crystals may be growing while vaterite is undergoing dissolution in the aqueous medium.

In some embodiments, when the composition comprising carbonate is a PCS composition, the vaterite may be stable such that the vaterite does not convert to aragonite but interacts with aluminate of CAC to form beneficial aluminate phases.

In some embodiments, the composition of the invention, as prepared by the methods described herein, is treated with the aqueous medium under one or more suitable conditions. The aqueous medium includes, but is not limited to, fresh water optionally containing sodium chloride, calcium chloride, magnesium chloride, or combination thereof or aqueous medium may be brine. In some embodiments, aqueous medium is fresh water. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-60° C.; or 0-40° C.; or 25-100° C.; or 25-50° C.; or 37-100° C.; or 37-60° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition (aqueous medium: dry components or aqueous medium:composition) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

In some embodiments, the composition may be rinsed with fresh water to remove halite or the chloride content from the composition. The chloride may be undesirable in some applications, for example, in aggregates intended for use in concrete since the chloride may have a tendency to corrode rebar. Further, the rinsing of the slurry or the composition with water may cause the vaterite in the composition to shift to more stable forms such as aragonite and result in the cemented material. For example, the cementing composition can be kept in the saltwater until before use and is rinsed with fresh water that may remove the halite from the composition and facilitate the formation of the cemented material.

In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the composition, thereby reducing the yield loss and the conversion to cemented material.

During the mixing of the composition with the aqueous medium, the composition may be subjected to high shear mixer. After mixing, the composition may be dewatered again and placed in pre-formed molds to make formed building materials. Alternatively, the composition may be mixed with water and is allowed to set. The composition sets over a period of days and is then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The composition is then subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50% or 60% humidity.

The cement product produced by the methods described above may be an aggregate or building material or a pre-cast material or a formed building material. These materials have been described herein.

C. Products

In one aspect, there are provided building materials comprising the cementitious composition which includes the composition comprising carbonate and the CAC. In one aspect, there is provided a building material formed from the cementitious composition which includes the composition comprising carbonate and the CAC. Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof. Since these structures or building materials comprise and/or are produced from the compositions of the invention, they may include markers or components that identify them as being obtained from carbon dioxide of fossil fuel origin ($\delta^{13}C$ value) and/or being obtained from water having trace amounts of various elements present in the initial salt water source, as described herein.

In one aspect, there are provided formed building materials comprising the cementitious composition which includes the composition comprising carbonate and the CAC. In some embodiments, the formed building material is formed from the cementitious compositions of the invention. The formed building material may be a pre-cast building material, such as, a pre-cast concrete product. The formed building materials and the methods of making and using the formed building materials are described in U.S. application Ser. No. 12/571, 398, filed Sep. 30, 2009, which is incorporated herein by reference in its entirety. The formed building materials of the invention may vary greatly and include materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition of the invention is employed in making such materials. In some embodiments, the formed building materials made from the cementitious composition of the invention have a compressive strength of at least 14 MPa; or between about 14-100 MPa; or between about 14-45 MPa; or the compressive strength of the cementitious composition of the invention after setting, and hardening, as described herein. In some embodiments, the formed building materials made from the cementitious composition of the invention have a $\delta^{13}C$ of less than −12‰; or less than −13‰; or less than −14‰; or less than −15‰; or from −15% to −80‰; or the $\delta^{13}C$ of the composition of the invention, as described herein.

In one aspect, there are provided methods to form formed building materials comprising mixing the cementitious composition comprising the composition comprising carbonate and CAC with water and pouring the wet composition in a mold to form formed building material. In some embodiments, the wet composition includes less than 90% by wt solid material; or less than 80% by wt solid material; or less than 70% by wt solid material; or less than 60% by wt solid material; or less than 50% by wt solid material; or less than 40% by wt solid material; or less than 30% by wt solid material; or less than 20% by wt solid material; or less than 10% by wt solid material; or between 10-99% by wt solid material; or between 10-90% by wt solid material; or between 10-80% by wt solid material; or between 10-70% by wt solid material; or between 10-50% by wt solid material; or between 10-30% by wt solid material; or between 40-90% by wt solid material; or between 50-90% by wt solid material.

One example of the formed building materials is masonry units. Masonry units are formed building materials used in the construction of load-bearing and non-load-bearing structures that are generally assembled using mortar, grout, and the like. Exemplary masonry units formed from the compositions of the invention include bricks, blocks, and tiles. Bricks and blocks of the invention are polygonal structures possessing linear dimensions. Bricks are masonry units with dimensions (mm) not exceeding 337.5×225×112.5 (length×width×height). Any unit with dimensions (mm) between 337.5× 225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles).

One type of masonry unit provided by the invention is a brick, which refers to a structural unit of material used in masonry construction, generally laid using mortar. Bricks formed from the compositions of the invention are masonry units with dimensions (mm) not exceeding 337.5×225×112.5 (length×width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm. Bricks may vary in grade, class, color, texture, size, weight and can be solid, cellular, perforated, frogged, or hollow. Bricks formed from the compositions of the invention may include, but are not limited to, building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks formed from the compositions of the invention may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks may vary considerably in physical and mechanical properties. The compressive strength of bricks formed from the compositions of the invention may range, in certain instances, from 5 to 100 MPa; or 20-100 MPa; or 50-100 MPa; or 80-100 MPa; or 20-80 MPa; or 20-40 MPa; or 60-80 MPa.

The flexural strength of bricks formed from the compositions of the invention may vary, ranging from 0.5 to 10 MPa, including 2 to 7 MPa, such as 2 to 5 MPa. The maximum water absorption of bricks may vary, ranging from 5 to 25%, including 10 to 15%. Bricks formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks formed from the compositions of the invention may have a volume abrasion loss ranging from 1.0 to 4.0 cm$^3$/cm$^2$, including 1.5 to 2.5 cm$^3$/cm$^2$, or 2.0 cm$^3$/cm$^2$. The composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided by the invention is blocks, (e.g., concrete, cement, foundation, etc.). Blocks are distinct from bricks based on their structural dimensions. Specifically, blocks exceed the dimensions (mm) of 337.5× 225×112.5 (length×width×height). Blocks formed from the compositions of the invention may vary in color, texture, size, and weight and can be solid, cellular, and hollow or employ insulation (e.g., expanded polystyrene foam) in the block void volume. Blocks may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm. The blocks may also vary in faceshell thickness. In some instances, the blocks may have faceshell thicknesses ranging from 15 to 40 mm, including 20 to 30 mm, such as 25 mm. The blocks may also vary in web thickness. In some embodiments, the blocks may have web thicknesses ranging from 15 to 30 mm, including 15 to 25 mm, such as 20 mm. The blocks formed from the compositions of the invention may vary considerably in physical and mechanical properties. The compressive strength of blocks may vary, in certain instances ranging from 5 to 100 MPa, including 15 to 75 MPa, such as 20 to 40 MPa. The flexural strength of blocks formed from the compositions of the invention may also vary, ranging from 0.5 to 15 MPa, including 2 to 10 MPa, such as 4 to 6 MPa. The maximum water absorption of the blocks may vary, ranging from 7 to 20% by weight including 8 to 15%, such as 9 to 11%. Blocks formed from the compositions of the invention may also undergo moisture movement (expansion or contraction) due to the absorption or loss of water to its environment. Blocks may be Type I moisture-controlled units or Type II non-moisture-controlled units. The dimensional stability (i.e., linear shrinkage) of the blocks formed from the compositions of the invention may vary depending on their intended use and/or geographical location of use, in certain instances ranging from 0.02 to 0.15%, such as 0.03 to 0.05%. The composition of the invention may be molded, extruded, or sculpted into the desired shape and size to form a block. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided by the invention is a tile. Tiles formed from the compositions of the invention refer to non-load-bearing building materials that are commonly employed on roofs and to pave exterior and interior floors of commercial and residential structures. Some examples where tiles may be employed include, but are not limited to, ceiling tiles, the roofs of commercial and residential buildings, decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles formed from the compositions of the invention may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles formed from the compositions of the invention may also vary, in certain instances ranging from 5 to 75 MPa, including 15 to 40 MPa, such as 25 MPa. The flexural strength of tiles formed from the compositions of the invention may vary, ranging from 0.5 to 7.5 MPa, including 2 to 5 MPa, such as 2.5 MPa. The maximum water absorption of tiles may also vary, in certain instances ranging from 5 to 15%, including 7 to 12%. Tiles of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 cm$^3$/cm$^2$, including 1.5 to 3.0 cm$^3$/cm$^2$, such as, 2.7 cm$^3$/cm$^2$. Tiles may be polygonal, circular or take on any other desired shape.

As such, the composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Construction panels are formed building materials employed in a broad sense to refer to any non-load-bearing structural element that are characterized such that their length and width are substantially greater than their thickness. Exemplary construction panels formed from the compositions of the invention include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm. Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel formed from the compositions of the invention is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm. Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The composition of the invention may be used to produce the desired shape and size to form a cement board. In addition, a variety of further components may be added to the cement boards which include, but are not limited to, plasticizers, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards formed from the compositions of the invention then may be covered in a fiberglass mat on both faces of the board. Where desired, the cement boards formed from the compositions of the invention may also be prepared using chemical admixtures such that they possess increased fire, water, and frost resistance as well as resistance to damage by bio-degradation and corrosion. The cement board may also be combined with components such as dispersed glass fibers, which may impart improved durability, increased flexural strength, and a smoother surface.

Another type of construction panel provided by the invention is fiber-cement siding. Fiber-cement sidings formed from the compositions of the invention are formed building materials used to cover the exterior or roofs of buildings and include, but are not limited to, building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm. Fiber-cement sidings formed from the compositions of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The composition of the invention may be used to produce the desired shape and size to form a fiber-cement siding. In addition, a variety of further components may be added to the fiber-cement sidings which include, but are not limited to, cellulose fibers, plasticizers, foaming agents, accelerators, retarders and air entrainment additives. The composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings formed from the compositions of the invention may also be prepared using chemical admixtures such that they possess increased fire, water, and frost resistance as well as resistance to damage by bio-degradation and corrosion.

Another type of construction panel formed from the compositions of the invention is drywall. The term drywall refers to the commonly manufactured building material that is used to finish construction of interior walls and ceilings. In certain instances, drywall building materials are panels that are made of a paper liner wrapped around an inner core. The inner core of drywall of the invention will include at least some amount of the composition of the invention. The dimensions of the drywall building materials of the invention may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. Drywall provided by the invention may possess physical and mechanical properties that vary considerably, and may depend upon the amount of the conventional constituents of drywall preparation that are replaced with the composition of the invention. The flexural and compressive strengths of drywall provided by the invention are generally larger than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. The maximum water absorption of drywall of the invention may vary, ranging from 2 to 10% by mass, including 4 to 8%, such as 5%. In certain embodiments, the inner core will be analogous to a conventional drywall core which is made primarily from gypsum plaster (the semi-hydrous form of calcium sulfate ($CaSO_4 \cdot \frac{1}{2}H_2O$), with at least a portion of the gypsum component replaced with the composition of the invention. In addition, the core may include a variety of further components, such as, but not limited to, fibers (e.g., paper and/or fiberglass), plasticizers, foaming agents, accelerators, e.g., potash, retarders, e.g., EDTA or other chelators, various additives that increase mildew and fire resistance (e.g., fiberglass or vermiculite), and water. The portion of components replaced with the composition of the invention may vary, and in certain instances is 5% by weight or more, including 10% by weight or more, 25% by weight or more, 50% by weight or more, 75% by weight or more, 90% by weight or more, or even 100% by weight. In producing the drywall, the core components may be combined and the resultant composition sandwiched between two sheets of outer material, e.g., heavy paper or fiberglass mats. When the core sets and is dried in a large drying chamber, the sandwich becomes rigid and strong enough for use as a building material.

Another building material formed from the compositions of the invention is a conduit. Conduits are tubes or analogous structures configured to convey a gas or liquid, from one location to another. Conduits of the invention can include any of a number of different structures used in the conveyance of a liquid or gas that include, but are not limited to, pipes, culverts, box culverts, drainage channels and portals, inlet structures, intake towers, gate wells, outlet structures, and the like. Conduits of the invention may vary considerably in shape, which is generally determined by hydraulic design and installation conditions. Shapes of conduits of the invention may include, but are not limited to circular, rectangular, oblong, horseshoe, square, etc. Multiple cell configurations of conduits are also possible. Conduit design may vary depending on its intended use. As such, conduits formed from the compositions of the invention may have dimensions that vary considerably. Conduits may have outer diameters which range in length from 5 to 500 cm or longer, such as 10 to 300 cm, e.g., 25 to 250 cm. The wall thicknesses may vary considerably, ranging in certain instances from 0.5 to 25 cm or thicker, such as 1 to 15 cm, e.g., 1 to 10 cm. In certain embodiments, conduits may be designed in order to support high internal pressure from water flow within the conduit. In yet other embodiments, conduits formed from the compositions of the invention may be designed to support high external loadings (e.g., earth loads, surface surcharge loads, vehicle loads, external hydrostatic pressures, etc.). Accordingly, the compressive strength of the walls of conduits of the invention may also vary, depending on the size and intended use of the conduit, in some instances ranging, from 5 to 75 MPa, such as 10 to 50 MPa, e.g., 15 to 40 MPa. Where desired, the conduits may be employed with various coatings or liners (e.g., polymeric), and may be configured for easy joining with each other to produce long conveyance structures made up of multiple conduits of the invention. In producing conduits of the invention, the composition after combining with water is poured into a mold in order to form the desired conduit shape and size. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight conduit structure. The shaped composition is further allowed to set and is cured in an environment with a controlled temperature and humidity. In addition, the conduits of the invention may include a variety of further components, such as, but not limited to, plasticizers, foaming agents, accelerators, retarders and air entrainment additives. Where desired, the further components may include chemical admixtures such that the conduits of the invention possess increased resistance to damage by bio-degradation, frost, water, fire and corrosion. In some embodiments, the conduits formed from the compositions of the invention may employ structural support components such as, but not limited to, cables, wires and mesh composed of steel, polymeric materials, ductile iron, aluminum or plastic.

Another building material formed from the compositions of the invention is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins may be configured so that they may be connected to other basins so that they may form a connected series of basins. In producing basins, the composition after combining with water may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins formed from the compositions of the invention may include a variety of further components, such as, but not limited to, plasticizers, foaming agents, accelerators, retarders and air entrainment additives. Where desired, the further components may include chemical admixtures such that the basins of the invention possess increased resistance to damage by bio-degradation, frost, water, fire and corrosion. In some embodiments, the basins of the invention may employ structural support components such as, but not limited to, cables, wires and mesh composed of steel, polymeric materials, ductile iron, aluminum or plastic.

Another building material formed from the compositions of the invention is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams of the invention may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams formed from the compositions of the invention may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams formed from the compositions of the invention may be internal or external, and may be symmetrically loaded or asymmetrically loaded. In some embodiments, beams may be composite, wherein it acts compositely with other structural units by the introduction of appropriate interface shear mechanisms. In other embodiments, beams may be non-composite, wherein it utilizes the properties of the basic beam alone. In producing beams of the invention, the composition of the invention after mixing with water may be poured into a beam mold or cast around a correlated steel reinforcing beam structure (e.g., steel rebar). In some embodiments, the steel reinforcement is pretensioned prior to casting the composition around the steel framework. In other embodiments, beams of the invention may be cast with a steel reinforcing cage that is mechanically anchored to the concrete beam. The beams of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams of the invention may include a variety of further components, such as but not limited to, plasticizers, foaming agents, accelerators, retarders and air entrainment additives. Where desired, the further components may include chemical admixtures such that the beams of the invention possess increased resistance to damage by bio-degradation, frost, water, fire and corrosion.

Another building material formed from the compositions of the invention is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts. Columns formed from the compositions of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns formed from the compositions of the invention possess a width that is not more than four times its thickness. Columns formed from the compositions of the invention may be constructed such that they are solid, hollow (e.g., decorative columns), reinforcement filled, or any combination thereof. Columns can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns may vary in their mechanical and physical properties.

Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the composition after combination with water may be poured into a column form or cast around a correlated steel reinforcing column structure (e.g., steel rebar). In some embodiments, the steel reinforcement is pre-tensioned prior to casting the composition around the steel framework. In other embodiments, columns of the invention may be cast with a steel reinforcing cage that is mechanically anchored to the concrete column. The columns of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns of the invention may include a variety of additional components, such as but not limited to, plasticizers, foaming agents, accelerators, retarders and air entrainment additives. Where desired, these additional components may include chemical admixtures such that the columns of the invention possess increased resistance to damage by bio-degradation, frost, water, fire and corrosion.

Another building material formed from the compositions of the invention is a concrete slab. Concrete slabs are those building materials used in the construction of prefabricated foundations, floors and wall panels. In some instances, a concrete slab may be employed as a floor unit (e.g., hollow plank unit or double tee design). In other instances, a precast concrete slab may be a shallow precast plank used as a foundation for in-situ concrete formwork. Wall panels are, in a broad sense, vertical load-bearing members of a building that are polygonal and possess a width that is more than four times its thickness. Precast concrete foundation, floors and wall panels may vary considerably in dimension depending on the intended use of the precast concrete slab (e.g., one or two story building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials such as slabs, and structures made therefrom, may be thicker than corresponding structures that lack components of the composition of the invention. In addition, structures made from amorphous building materials formed from the composition of the invention may be thicker than corresponding structures that are not formed from the composition of the invention.

In some embodiments, thickness of formed building materials or related structures is increased by 1.5 fold or more, 2-fold or more, or 5-fold or more. Concrete slabs formed from the compositions of the invention may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs, the composition after combination with water may be poured into a slab mold or cast around a correlated steel reinforcing structure (e.g., steel rebar). In some embodiments, the steel reinforcement is pretensioned prior to casting the composition around the steel framework. In other embodiments, slabs of the invention may be cast with a steel reinforcing cage that is mechanically anchored to the concrete slab. In some embodiments, the concrete slabs of the invention may improve its structural capacity by casting a second, supportive concrete layer that is mechanically anchored to the previously precast concrete slab. The slabs formed from the compositions of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the slabs of the invention may include a variety of further components, such as but not limited to, plasticizers, foaming agents, accelerators, retarders and air entrainment additives. Where desired, the further components may include chemical admixtures such that the slabs formed from the compositions of the invention possess increased resistance to damage by bio-degradation, frost, water, fire and corrosion.

Another building material formed from the compositions of the invention is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc. Acoustic barriers formed from the compositions of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers formed from the compositions of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers formed from the compositions of the invention may employ sound absorptive material (e.g., wood shavings, textile fibers, glass wool, rock wool, polymeric foam, vermiculite, etc.) in addition to a structurally reinforcing framework. In some embodiments, acoustic barriers may be used as noise-reduction barriers in an outdoor environment (e.g., along a highway, near an airport, etc.) and may be employed with structural support components (e.g., columns, posts, beams, etc.). In producing acoustic barriers of the invention, the composition of the invention after combination with water is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to, plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to, cables, wires and mesh composed of steel, ductile iron, polymeric fibers, aluminum or plastic.

Another building material formed from the compositions of the invention is an insulation material, which refers to a material used to attenuate or inhibit the conduction of heat. Insulation may also include those materials that reduce or inhibit radiant transmission of heat. Insulation material may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments of the invention, an amount of cementitious forming material may be replaced by the above described composition of the invention. Binding compositions for the insulation material of the invention include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments of the invention, an amount of the binding composition may be replaced by the above described composition of the invention. Where desired, insulation material of the invention may also be prepared using a chemical admixture or any other convenient protocol such that they are resistant to damage by termites, insects, bacteria, fungus. Etc. Insulation materials of the invention may be prepared using any convenient protocol such that they are freeze/thaw, rain and fire resistant. Insulation material of the invention may be prepared in accordance with traditional manufacturing protocols for such materials, with the exception that the composition of the invention is employed. In producing the insulation materials of the invention, an amount of the composition of the invention may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

In some embodiments, the formed building material such as pre-cast concrete products include, but are not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

In one aspect, there are provided ceramic compositions comprising the cementitious composition of the invention. Conventionally ceramic material is prepared by action of heat and subsequent cooling of an inorganic solid. Ceramic material typically is a strong material however, it is brittle in nature. The ceramic composition of the invention does not require high heating and cooling steps. Further, the ceramic composition of the invention is strong and non-brittle. The ceramic composition of the invention is strong due to strong bond formed after cementation. The ceramic composition of the invention may be used to make formed building materials such as tiles or materials that mimic synthetic marble or limestone. The ceramic composition of the invention may be coated with materials such as epoxy coating to provide glossy and smooth surface.

D. Systems

In some embodiments, the invention provides systems configured to perform the methods of the invention. In some embodiments, a system that includes a cement producing station that is configured to accept the composition of the invention is provided. The cement producing station may be a mixing tank, pipe or a conduit. In some such embodiments, a CAC source is provided which provides CAC to the system. In such embodiments, the system accepts PCS or self-cement from the cement producing station and CAC from the CAC source and produces a cementitious composition suitable for structural building applications. In some embodiments, the system includes an aggregate source that is connected to the cement producing station. In some embodiments, the aggregate source provides aggregate to the cement producing station. In some embodiments, the aggregate includes at least 80 wt % carbonate mineral and has a $\delta^{13}C$ value less than −10‰. In some embodiments, the cement producing station is configured to produce the composition comprising carbonate using carbon dioxide from a carbon dioxide source, alkaline solution from an alkali source or proton removing agent source, and divalent cations from a divalent cation source. Such sources have been described herein. In some embodiments, the system further includes an alkali source operably connected to the cement producing station configured to electrochemically produce the alkaline solution.

Figure 5:
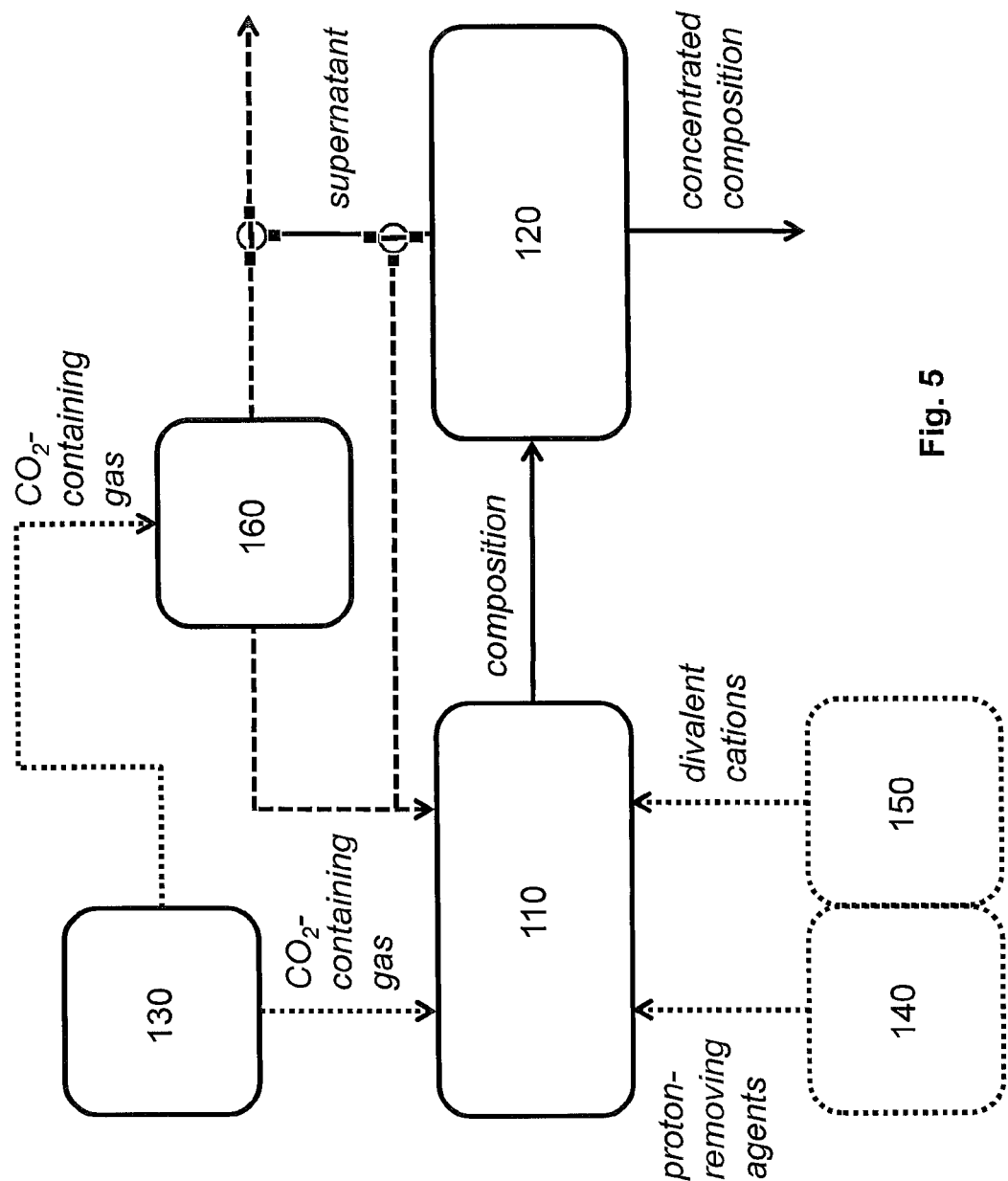
FIG. 5 illustrates a flow diagram for some embodiments provided herein.

In some embodiments, a system such as system illustrated in FIG. 5 is provided for processing carbon dioxide, wherein the system comprises a processor (110) and a treatment system (120) configured for an aqueous-based process for processing carbon dioxide from a source of carbon dioxide (130), using a source of proton-removing agents (140) and/or a source of divalent cations (150). The source of carbon dioxide optionally comprises one or more additional components to carbon dioxide. The system further comprises an electrochemical system (160), and the processor, the treatment system, and the electrochemical system may be operably connected for recirculating a portion of treatment system supernatant.

The processor of such carbon-dioxide processing systems may comprise a contactor such as a gas-liquid or a gas-liquid-solid contactor, wherein the contactor is configured for charging an aqueous solution or slurry with carbon dioxide to produce a carbon dioxide-charged composition, which composition may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates. The processor of carbon dioxide-processing systems of the invention may be configured to receive treatment system supernatant or an electrochemical system stream in the contactor (e.g., gas-liquid contactor, gas-liquid-solid contactor), the reactor, a combination of the contactor and the reactor, or in any other unit or combination of units in the processor.

The treatment system of such carbon dioxide-processing systems may comprise a dewatering system and/or a filtration system. As such, the dewatering system, the filtration system, or a combination of the dewatering system and the filtration system may be configured to provide at least a portion of supernatant to the processor for processing carbon dioxide, to the electrochemical system, or both. Though not shown, the treatment system may also be configured to provide at least a portion of supernatant to a washing system configured to wash compositions of the invention, wherein the compositions comprise precipitation material (e.g., $CaCO_3$, $MgCO_3$, or combinations thereof). In some embodiments, the carbon dioxide-processing system may be configured to provide at least a portion of the supernatant to a system (e.g., desalination plant) or process (e.g., desalination) external to the carbon-dioxide processing system. For example, a system of the invention may be operably connected to a desalination plant such that the system provides at least a portion of treatment system supernatant to the desalination plant for desalination.

The processor-produced composition may be provided to any of a number of treatment system sub-systems, which sub-systems include, but are not limited to, dewatering systems, filtration systems, or dewatering systems in combination with filtration systems, wherein treatment systems, or a sub-systems thereof, separate supernatant from the composition to produce a concentrated composition (e.g., the concentrated composition is more concentrated with to respect to carbonates, bicarbonates, or carbonates and carbonates).

Recirculation of treatment system supernatant may be advantageous as recirculation may provide efficient use of available resources; minimal disturbance of surrounding environments; and reduced energy requirements, which may provide lower carbon footprints for systems and methods provided herein. When a carbon dioxide-processing system of the invention is operably connected to an industrial plant (e.g., fossil fuel-fired power plant such as coal-fired power plant) and utilizes power generated at the industrial plant, reduced energy requirements provided by recirculation of treatment system supernatant provide for a reduced parasitic load on the industrial plant.

The parasitic load of carbon dioxide-processing systems of the invention may be further reduced by efficient use of other resources. In some embodiments, the parasitic load of carbon dioxide-processing systems of the invention may be further reduced by efficient use of heat from an industrial source. In some embodiments, for example, heat from the industrial source of carbon dioxide (e.g., flue gas heat from a coal-fired power plant) may be utilized for drying a composition comprising precipitation material comprising carbonates, bicarbonates, or carbonates and bicarbonates. In such embodiments, a spray dryer may be used for spray drying the composition. For example, low-grade (e.g., 150-200° C.) waste heat may be utilized by means of a heat exchanger to evaporatively spray dry the composition comprising the precipitation material. In addition, utilizing heat from the industrial source of carbon dioxide for drying compositions of the invention allows for simultaneous cooling of the industrial source of carbon dioxide (e.g., flue gas from a coal-fired power plant), which enhances dissolution of carbon dioxide, a process which is inversely related to temperature.

In some embodiments, the parasitic load of carbon dioxide-processing systems of the invention may be further reduced by efficient use of pressure. For example, in some embodiments, carbon dioxide-processing systems of the invention are configured with an energy recovery system. Such energy recovery systems are known, for example, in the art of desalination and operate by means of pressure exchange. As such, carbon dioxide-processing systems of the invention configured for recirculation, heat exchange, and/or pressure exchange may reduce the parasitic load on power-providing industrial plants while maintaining carbon dioxide processing capacity.

The gaseous waste stream may be provided by the industrial plant to the $CO_2$-processing system of the invention in any convenient manner that conveys the gaseous waste stream. In some embodiments, the waste gas stream is provided with a gas conveyor (e.g., a duct, pipe, etc.) that runs from flue or analogous structure of the industrial plant (e.g., a flue of the industrial plant) to one or more locations of the $CO_2$-processing system. In such embodiments, a line (e.g., a duct, pipe, etc.) may be connected to the flue of the industrial plant such that gas leaving through the flue is conveyed to the appropriate location(s) of the $CO_2$-processing system (e.g., processor or a component thereof, such as a gas-liquid contactor or gas-liquid-solid contactor). Depending upon the particular configuration of the $CO_2$-processing system, the location of the gas conveyor on the industrial plant may vary, for example, to provide a waste gas stream of a desired temperature. As such, in some embodiments, where a gaseous waste stream having a temperature ranging for 0° C. to 2000° C., such as 0° C. to 1800° C., including 60° C. to 700° C., for example, 100° C. to 400° C. is desired, the flue gas may be obtained at the exit point of the boiler, gas turbine, kiln, or at any point of the power plant that provides the desired temperature. The gas conveyor may be configured to maintain flue gas at a temperature above the dew point (e.g., 125° C.) in order to avoid condensation and related complications. Other steps may be taken to reduce the adverse impact of condensation and other deleterious effects, such as employing ducting that is stainless steel or fluorocarbon (such as poly(tetrafluoroethylene)) lined such the duct does not rapidly deteriorate.

The following examples are put forth so as to provide those of ordinary skill in the art with a complete disclosure and description of how to make and use the claimed invention, and are not intended to limit the scope of the invention. Efforts have been made to ensure accuracy with respect to numbers used (e.g. amounts, temperature, etc.), but some experimental errors and deviations should be accounted for. Unless indicated otherwise, parts are parts by weight, molecular weight is weight average molecular weight, temperature is in degrees Centigrade (° C.), and pressure is at or near atmospheric.

EXAMPLES

The following analytical instrumentation and methods of use thereof may be used to characterize materials produced in accordance with description provided herein.

Coulometry: Liquid and solid carbon containing samples were acidified with 2.0 N perchloric acid (HClO4) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). Samples of cement, fly ash, and seawater are heated after addition of perchloric acid with a heated block to aid digestion of the sample.

Brunauer-Emmett-Teller (BET) Specific Surface Area: Specific surface area (SSA) measurement was by surface absorption with dinitrogen (BET method). SSA of dry samples was measured with a Micromeritics Tristar™ II 3020 Specific Surface Area and Porosity Analyzer after preparing the sample with a Flowprep™ 060 sample degas system. Briefly, sample preparation involved degassing approximately 1.0 g of dry sample at an elevated temperature while exposed to a stream of dinitrogen gas to remove residual water vapor and other adsorbants from the sample surfaces. The purge gas in the sample holder was subsequently evacuated and the sample cooled before being exposed to dinitrogen gas at a series of increasing pressures (related to adsorption film thickness). After the surface was blanketed, the dinitrogen was released from the surface of the particles by systematic reduction of the pressure in the sample holder. The desorbed gas was measured and translated to a total surface area measurement.

Particle Size Analysis (PSA): Particle size analysis and distribution were measured using static light scattering. Dry particles were suspended in isopropyl alcohol and analyzed using a Horiba Particle Size Distribution Analyzer (Model LA-950V2) in dual wavelength/laser configuration. Mie scattering theory was used to calculate the population of particles as a function of size fraction, from 0.1 mm to 1000 mm.

Powder X-ray Diffraction (XRD): Powder x-ray diffraction was undertaken with a Rigaku Miniflex™ (Rigaku) to identify crystalline phases and estimate mass fraction of different identifiable sample phases. Dry, solid samples were hand-ground to a fine powder and loaded on sample holders. The X-ray source was a copper anode (Cu kα), powered at 30 kV and 15 mA. The X-ray scan was run over 5-90°2θ, at a scan rate of 2°2θ per min, and a step size of 0.01°2θ per step. The X-ray diffraction profile was analyzed by Rietveld refinement using the X-ray diffraction pattern analysis software Jade™ (version 9, Materials Data Inc. (MDI)).

Scanning Electron Microscopy (SEM): SEM was performed using a Hitachi TM-1000 tungsten filament tabletop microscope using a fixed acceleration voltage of 15 kV at a working pressure of 30-65 Pa, and a single BSE semiconductor detector. Solid samples were fixed to the stage using a carbon-based adhesive; wet samples were vacuum dried to a graphite stage prior to analysis. EDS analysis was performed using an Oxford Instruments SwiftED-™ system, the sensor for which has a detection range of 11Na-92U with an energy resolution of 165 eV.

Alternatively, SEM was performed using a Hitachi SU-6600 field emission microscope capable of operation at accelerating voltages ranging from 0.5-30 kV at working pressures ranging from 10-8-300 Pa. Available detectors include a SE, BSE, and ESED. EDX analysis utilized an Oxford Instruments INCA EnergySEM 350 Energy Dispersive Microanalysis system with INCA X-ACT Analytical Drift Detector, having a detection range of Be—Pu and a resolution of 129 eV. Sample preparation involves fixation to a stage by means of either a carbon-based adhesive or silver paint. Non-conductive samples are coated with a thin layer of either gold or carbon prior to analysis.

Chloride: Chloride concentrations were determined with Chloride QuanTab® Test Strips (Product No. 2751340), having a testing range between 300-6000 mg chloride per liter solution measured in 100-200 ppm increments.

X-ray Fluorescence (XRF): XRF analyses of solid powder samples were performed using a Thermo Scientific ARL QUANT'X Energy-Dispersive XRF spectrometer, equipped with a silver anode X-ray source and a Peltier cooled Si(Li) X-ray detector. The samples were pressed into 31 mm pellets using an aluminum sample cup. For each sample, three different spectra were gathered, each tailored for analysis of specific elements: the first using no X-ray filter at 4 kV, the second using a thin silver filter at 18 kV, and the third using a thick silver filter at 30 kV, all under vacuum conditions. Spectra were analyzed using WinTrace software, using a Fundamental Parameters analysis method attained from calibration with certified standard materials.

Thermogravimetric Analysis (TGA): TGA analyses of solid powder samples were performed with a TA Instruments SDT Q600 with simultaneous TGA/DSC (Differential Scanning calorimetry). Samples, in an alumina crucible, were placed into a furnace that was heated from room temperature to 1000° C. at a constant ramp rate of 20° C. per minute. The weight loss profile over temperature was analyzed using Universal Analysis software.

Inductively Coupled Plasma Optical Emission Spectrometry (ICP-OES): ICP-OES analyses of typical acidified, liquid samples were performed using a Thermo ICAP 6500 equipped with a CETAC autosampler. iTEVA control software was used for data acquisition and analysis. Although the detection limit for this method has not been determined typical detection limits are in the ppm range. Samples that contain high concentrations of dissolved salts (Na, Ca, Mg) were analyzed using the ICAP 6500 equipped with an ESI SEAfast autosampler equipped with a chelation column for matrix elimination analyte preconcentration.

Example 1

Characterization of CAC

Table 1 below provides characterization data for two batches of calcium aluminate cement (Ciment Fondu®) raw material that were used in the experiments described herein. The characterization data includes mineralogy, composition, particle morphology and size.

TABLE 1

|  |  | FOND-001 | FOND-002 |
|---|---|---|---|
| XRF Composition | $Al_2O_3$ | 36.4% | 35.8% |
|  | CaO | 36.4% | 36.3% |
|  | $SiO_2$ | 5.4% | 5.4% |
|  | $SO_3$ | 0.1% | 0.07% |
|  | $Fe_2O_3$ | 15.9% | 15.5% |
| PSA (mean) |  | 13 um | 11 um |
| BET |  | 1.2 $m^3$/kg |  |
| XRD dominant phases |  | CA $C_3A$ $C_4AF$ Amorphous |  |

Example 2

CAC Replacement with PCS (Binary Mixtures)

This experiment was related to the preparation of a binary mixture of PCS and CAC (mix of FOND-001 and FOND-002) and analyzing the properties of the prepared mixtures, such as compressive strength. The PCS was produced by Mineralization by Aqueous Precipitation (MAP) process. In the MAP process, a hard brine solution was prepared by diluting concentrated $CaCl_2$ to 0.355 mol/L and subsequently $Na_2SO_4$ was dissolved to a concentration of 0.0061 mol/L in the hard brine solution. Alkaline brine was prepared by absorbing $CO_2$ from raw flue gas from a natural gas power plant into a 1.382 mol/L NaOH solution, until the pH was between 10-11. The two solutions were mixed flowed into a mixed tank at rates of 8.17 gpm of hard brine solution and 3.88 gpm of alkaline solution. The precipitated slurry was pumped out of the bottom of the tank at a rate that maintained a constant volume of 70 gallons in the tank (average liquid residence time in the tank was 5.8 min). The slurry was allowed to gravity settle, while continuously decanting. The concentrated slurry was then filter pressed and subsequently dried in a swirl fluidized dryer resulting in the metastable PCS in the form of vaterite (98-99%).

The pastes of PCS and CAC were mixed with w:cm (water:cement)=0.50 and stored in closed container (100% relative humidity). The pastes were cured for 1, 7, 28, 90, and 365 days. After these specific periods of time, the pastes were arrested with acetone within 12 hours to limit HC and MC conversion.

Table 2 below provides the properties of the compositions.

TABLE 2

| Flow | w:cm | Contents |
|---|---|---|
| 76% | 0.49 | 100% CAC |
| 114% | 0.49 |  |
| 104% | 0.45 | 80% CAC/20% PCS |

Figure 6:
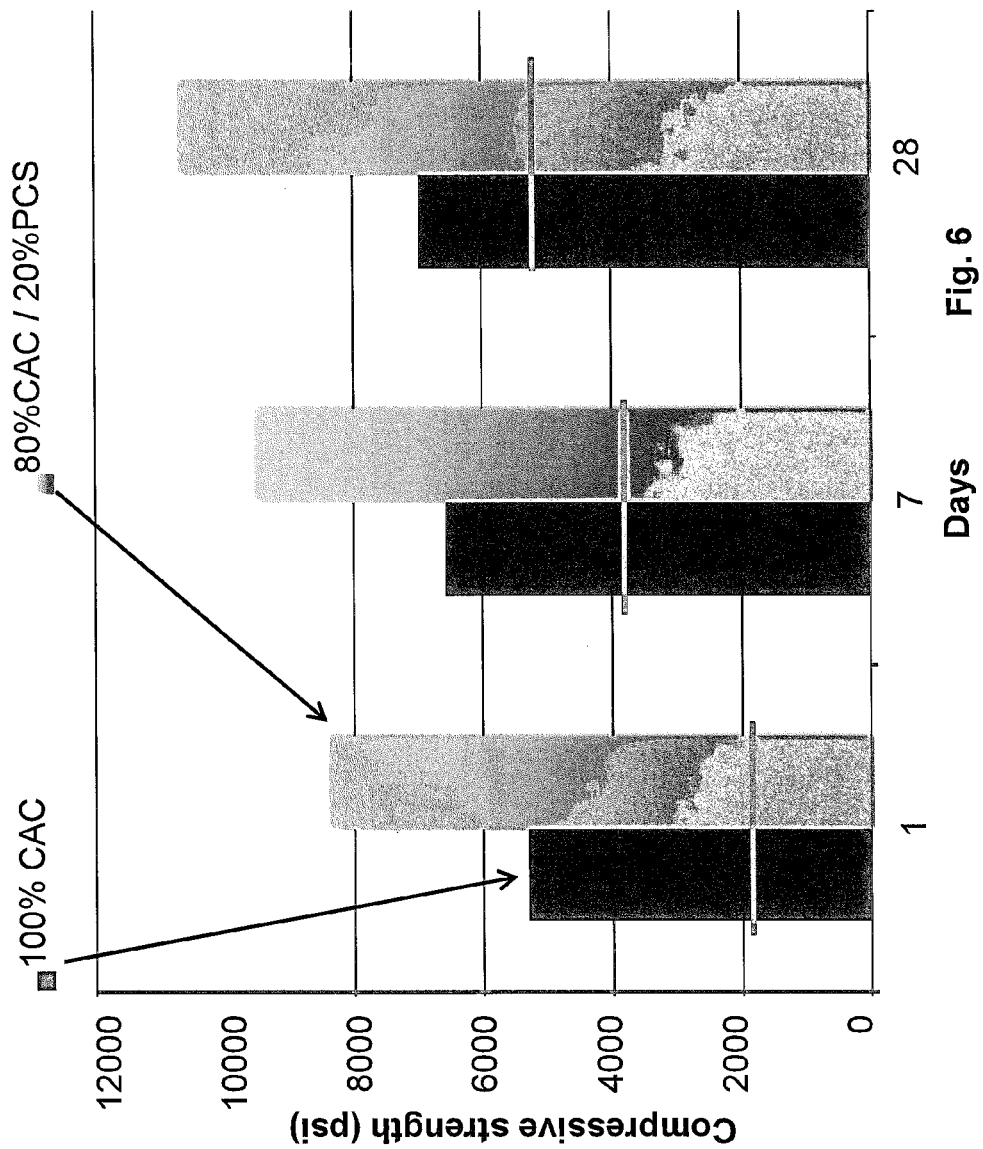
FIG. 6 illustrates compressive strength of the cement made from CAC alone compared to the compressive strength of the binary mixture of CAC and partial cement substitute (PCS), as described in Example 2 herein.

As illustrated in FIG. 6, the 1, 7, and 28-day compressive strengths of the cement made from CAC (e.g., Ciment Fondu®) alone showed poor compressive strength as compared to the binary mixture comprising CAC and PCS (e.g., 80% CAC/20% PCS), in which when a portion of CAC was replaced by PCS, the compressive strengths markedly increased.

Example 3

CAC Replacement with PCS (Binary Mixtures)

This experiment was related to the preparation of a binary mixture of PCS and CAC and analyzing the properties of the prepared mixtures, such as compressive strength. This experiment also compared the properties of the binary mixture of CAC and PCS with CAC and OmyaCarb3.

The PCS was produced by MAP process, as described in Example 2. Characterization of the PCS in terms of mineralogy, composition, and particle morphology and distribution is as shown in Table 3, 4, and 5.

TABLE 3

| Phase/Oxide | Amount in Sample (weight %) |
|---|---|
| Vaterite | 99 |
| Calcite | 1 |

TABLE 4

| Oxide | Amount in Sample (weight %) |
|---|---|
| CaO | 55.1 |
| MgO | 0.1 |
| SrO | 0.1 |
| $SO_3$ | 0.6 |
| LOI* | 44.1 |
| Moisture | 0.9 |

*LOI is mass lost on ignition to 950° C.

TABLE 5

| Mean particle size (PS) | 2.3 μm |
|---|---|
| Standard deviation (STD) | 0.8 μm |

OmyaCarb 3 is a ground limestone produced by Omya. Its characterization in terms of mineralogy, particle morphology and size are shown in Tables 6.

TABLE 6

| Mean particle size | 5.8 μm |
|---|---|
| Main phase | 100% Calcite |

Ciment fondu was replaced with 0, 10, 25, and 50% PCS and OmyaCarb 3 and tested for hydration product development and compressive strength development at room temperature (RT) at 1, 7, 28, and 90 days. The hydration product development and compressive strength development was analyzed using X-ray diffraction and scanning electron microscopy, and a compression loading device, respectively. For hydration products development, the cementitious materials (Ciment fondu with PCS or OmyaCarb 3) were mixed with a 0.5 water-to-cement ratio, casted and cured in sealed plastic containers at RT, and demolded and vacuum dried at the designated test date before analysis. For compressive strength testing (followed ASTM C 109), the cementitious materials were mixed with silica sand at a water-to-cement ratio to achieve a certain workability. The mixed slurry was then cast into 2×2×2 in cubes and cured at 100% RH for 1 day. At 1 day of reaction, the cubes had set and demolded and cured in DI water until testing at the designated test date. Compressive strength of the test cubes was measured through a compression loading device at a controlled loading rate (200-400 lbs/sec).

Figure 7:
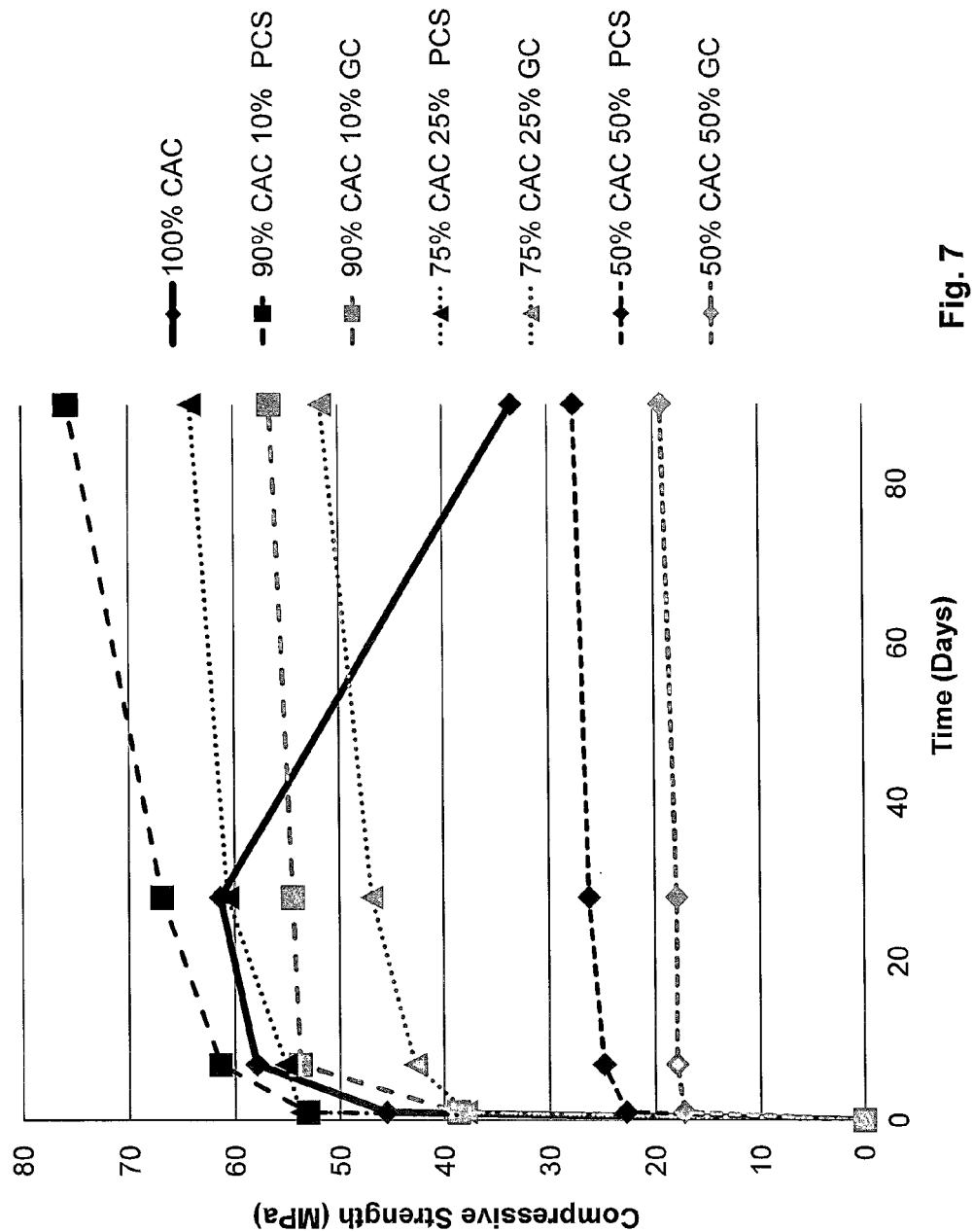
FIG. 7 illustrates compressive strengths of the cement made from CAC alone and CAC mixed with ground calcite (GC) as compared to the compressive strengths of the binary mixture of CAC and PCS, further described in Example 3 herein.

As illustrated in FIG. 7, the cement made from CAC (FOND-1 from Example 1) alone (i.e. 100% CAC) showed poor compressive strength which continued to decrease as the time progressed. However, when the vaterite containing PCS of the invention replaced a portion of CAC (10%, 25%, and 50% replacement), the compressive strengths of the cement were not just higher than CAC alone but also continued to increase over the same period of time. Further, the cement containing CAC with PCS showed higher compressive strength than the cement containing CAC with ground calcite (GC) or ground limestone. Therefore, the replacement of CAC with PCS enhances the properties of cement as compared to CAC alone or CAC mixed with GC.

Figure 8A:
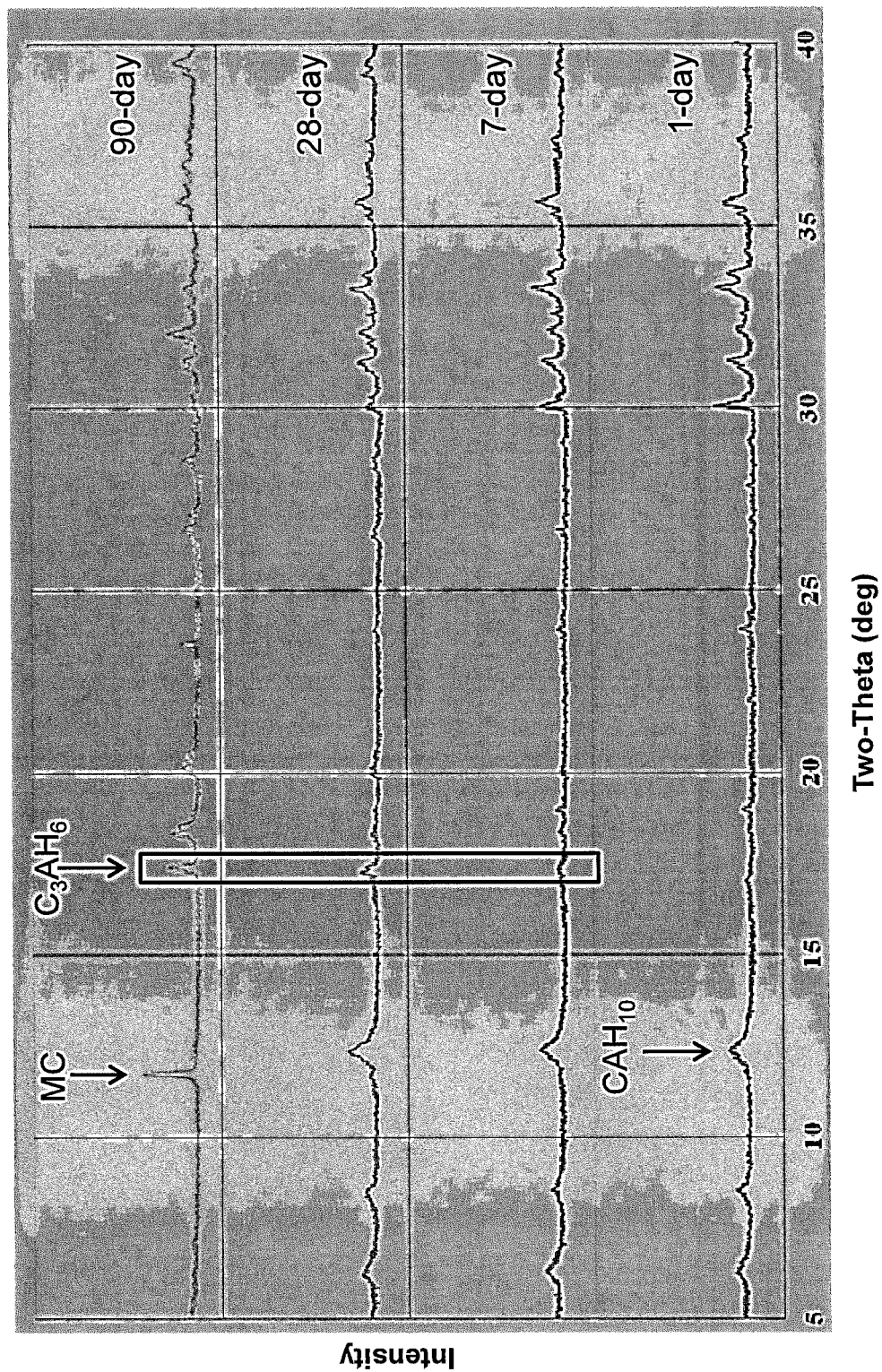
FIG. 8A illustrates x-ray diffraction (XRD) spectra of the cement made from 100% CAC over the period of 90 days, further described in Example 3 herein.
Figure 8B:
FIG. 8B illustrates scanning electron microscopy (SEM) image of the cement made from 100% CAC showing formation of $C_3AH_6$, further described in Example 3 herein.
Figure 9:
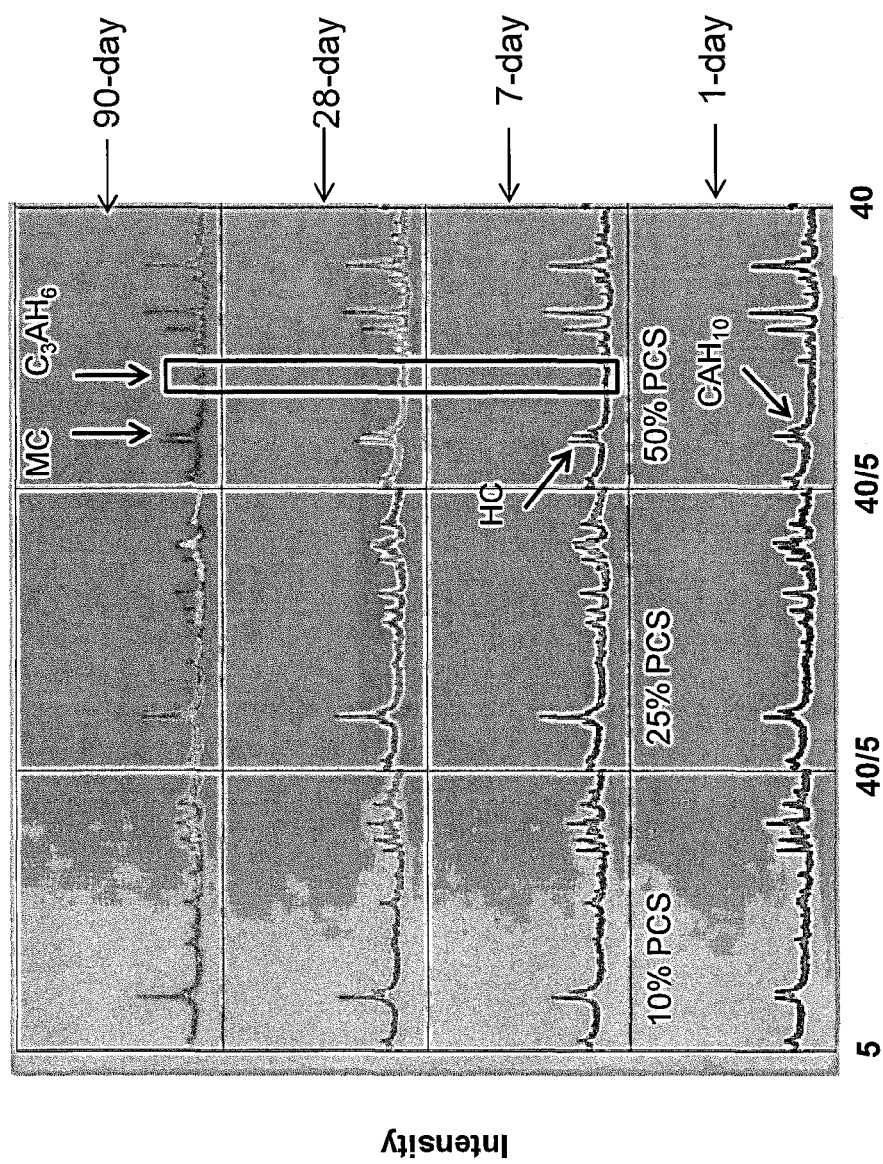
FIG. 9 illustrates XRD spectra of the cement made from CAC replacement with 10%, 25%, and 50% PCS over the period of 90 days, further described in Example 3 herein.

Typically, the compressive strength of CAC (for 100% CAC) decreases as the time progresses due to the conversion of $CAH_{10}$ to $C_3AH_6$, as illustrated in XRD in FIG. 8A and SEM image in FIG. 8B. It was observed that the replacement of CAC with PCS resulted in the conversion of $CAH_{10}$ to monocarboaluminate (MC) and hemicarboaluminate (HC) with minor $C_3AH_6$ formation, as illustrated in FIG. 9. It is contemplated that the formation of HC and MC results in the enhanced properties of the CAC with PCS.

It is further contemplated that CAC with PCS showed higher compressive strength than ground calcite at the same replacement levels and 100% CAC, potentially due to different reaction kinetics as illustrated in calorimeter data in FIGS. 10A and 10B and different microstructure development, as illustrated in FIG. 11A (100% CAC after 28 days); FIG. 11B (25% PCS+75% CAC after 28 days); and FIG. 11C (25% GC+75% CAC after 28 days).

As illustrated in calorimeter data in FIGS. 10A and 10B, PCS addition significantly accelerated the hydration reactions of calcium aluminate cement, where the main heat evolution peak appeared earlier with increasing amount of PCS addition. Furthermore, PCS accelerated the hydration reactions of calcium aluminate cement more than OmyaCarb 3 at the same level of addition, potentially due to a different chemical or physical effect on calcium aluminate cement hydration. FIG. 11C illustrates development of porous microstructure in the cement formed with 25% GC and 75% CAC which may be responsible for low compressive strengths.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A cementitious composition, comprising: calcium aluminate cement (CAC) and a composition comprising carbonate wherein the composition comprising carbonate comprises a metastable component selected from the group consisting of vaterite, amorphous calcium carbonate, and combination thereof.

2. The cementitious composition of claim 1, wherein the composition comprising carbonate comprises or has at least one of the following:
   a) at least 50 wt % vaterite;
   b) a $\delta^{13}C$ value less than −12.0‰;
   c) a wet paste pH of less than 12; and combinations thereof.

3. The cementitious composition of claim 1, wherein the composition comprising carbonate is a self-cement composition.

4. The cementitious composition of claim 1, wherein the composition comprising carbonate is a partial cement substitute.

5. The cementitious composition of claim 1, wherein the cementitious composition exhibits one or more of properties selected from the group consisting of higher reactivity of carbonate with aluminate phases, formation of monocarboaluminates, formation of hemicarboaluminates, higher compressive strength, higher durability over long time period, higher mechanical and structural properties, and combinations thereof, as compared to CAC alone.

6. The cementitious composition of claim 1, wherein the composition comprising carbonate has a mean particle size of between 1-25 microns.

7. The cementitious composition of claim 1, wherein the cementitious composition further comprises ordinary Portland cement, a Portland cement blend, pozzolan-lime cement, slag-lime cement, supersulfated cement, calcium sulfoaluminate cement, geopolymer cement, aggregate, admixtures, or combinations thereof.

8. The cementitious composition of claim 1, wherein the composition comprising carbonate comprises between 50-99 wt % vaterite.

9. The cementitious composition of claim 1, wherein the composition comprising carbonate has a $\delta^{13}C$ value of between −12.0‰ to −40‰.

10. The cementitious composition of claim 1, wherein the composition comprising carbonate comprises a wet paste pH of between 8-12.

11. The cementitious composition of claim 1, comprising between 5-80 wt % composition comprising carbonate and 20-95 wt % of CAC.

12. The cementitious composition of claim 1, wherein the carbonate in the composition comprising carbonate is derived in whole or in part from carbon dioxide removed from an industrial waste stream.

13. The cementitious composition of claim 1, wherein the cementitious composition after combination with water, setting, and hardening has a compressive strength of between 10-55MPa.

14. A method for forming a cementitious or concrete composition, comprising: combining a composition comprising carbonate wherein the composition comprising carbonate comprises a metastable component selected from the group consisting of vaterite, amorphous calcium carbonate, and combination thereof composition, with CAC to produce a cementitious or concrete composition.

15. The method of claim 14, further comprising a) making a composition comprising carbonate by contacting an industrial waste gas stream comprising carbon dioxide with a proton removing agent to form a carbon dioxide charged water; b) contacting the carbon dioxide charged water with divalent cations to form the composition comprising carbonate wherein the carbonate comprises a metastable component selected from the group consisting of vaterite, amorphous calcium carbonate, and combination thereof; and c) combining the composition comprising carbonate with CAC, to form the cementitious or the concrete composition.

16. The method of claim 15, wherein the contacting of the carbon dioxide charged water with the divalent cations is under precipitation conditions that favor the formation of the composition comprising a metastable component selected from the group consisting of vaterite, amorphous calcium carbonate, and combination thereof.

17. The method of claim 16, wherein the precipitation conditions favor the formation of more than 50 wt % vaterite in the composition.

18. The method of claim 16, wherein the precipitation conditions include temperature, pH, residence time, proton removing agent, additive, ion ratio, rate of precipitation, mixing rate, form of agitation, presence of seed crystal, catalyst, membrane, substrate, separation, drying, refining, and combinations thereof.

19. The method of claim 15, wherein the industrial waste gas stream is from an industrial plant include a power plant, chemical processing plant, steel mill, paper mill, cement plant, other industrial plant that produces $CO_2$ as a byproduct, and combinations thereof.

20. The method of claim 15, wherein the proton removing agent is NaOH, $Na_2CO_3$, KOH, $K_2CO_3$, $NH_4OH$, $Ca(OH)_2$, $Mg(OH)_2$, or combinations thereof.

21. The method of claim 15, wherein the divalent cation comprises calcium.

22. The method of claim 14, further comprising contacting the cementitious or the concrete composition with water when the vaterite converts to aragonite and the composition sets and hardens into cement.

23. The method of claim 14, further comprising contacting the cementitious or the concrete composition with water; interacting vaterite with aluminate in CAC; and forming monocarboaluminate, hemicarboaluminate, or combinations thereof 24. The method of claim 14, further comprising adding to the composition a component selected from the group consisting of ordinary Portland cement, a Portland cement blend, pozzolan-lime cement, slag-lime cement, supersulfated cement, calcium sulfoaluminate cement, geopolymer cement, and combinations thereof.

25. A composition, produced according to the method of claim 14.

* * * * *